(12) United States Patent
DeTreville

(10) Patent No.: US 7,139,915 B2
(45) Date of Patent: *Nov. 21, 2006

(54) METHOD AND APPARATUS FOR AUTHENTICATING AN OPEN SYSTEM APPLICATION TO A PORTABLE IC DEVICE

(75) Inventor: John D. DeTreville, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/253,460

(22) Filed: Oct. 19, 2005

(65) Prior Publication Data

US 2006/0036851 A1 Feb. 16, 2006

Related U.S. Application Data

(63) Continuation of application No. 10/619,153, filed on Jul. 14, 2003, now Pat. No. 7,010,684, which is a continuation of application No. 09/287,699, filed on Apr. 6, 1999, now Pat. No. 6,609,199, which is a continuation-in-part of application No. 09/266,207, filed on Mar. 10, 1999.

(60) Provisional application No. 60/105,891, filed on Oct. 26, 1998.

(51) Int. Cl.
*H04L 9/00* (2006.01)

(52) U.S. Cl. ................. 713/172; 713/156; 713/157; 713/168; 713/169; 713/175

(58) Field of Classification Search ............ None
See application file for complete search history.

(56) References Cited

U.S. PATENT DOCUMENTS

| 4,827,508 | A | 5/1989 | Shear |
|---|---|---|---|
| 4,969,189 | A | 11/1990 | Ohta et al. |
| 4,977,594 | A | 12/1990 | Shear |
| 5,007,082 | A | 4/1991 | Cummins |
| 5,023,907 | A | 6/1991 | Johnson et al. |
| 5,050,213 | A | 9/1991 | Shear |
| 5,140,634 | A | 8/1992 | Guillou et al. |
| 5,276,311 | A | 1/1994 | Hennige |
| 5,335,334 | A | 8/1994 | Takahashi et al. |
| 5,349,643 | A | 9/1994 | Cox et al. |
| 5,410,598 | A | 4/1995 | Shear |
| 5,473,690 | A | 12/1995 | Grimonprez et al. |

(Continued)

FOREIGN PATENT DOCUMENTS

EP 695985 2/1996

(Continued)

OTHER PUBLICATIONS

Stallings, Cryptography and Network Security, 1992, 2nd Edition, pp. 186-187.

(Continued)

*Primary Examiner*—Kambiz Zand
*Assistant Examiner*—Benjamin E. Lanier
(74) *Attorney, Agent, or Firm*—Lee & Hayes, PLLC

(57) ABSTRACT

A secure communication channel between an open system and a portable IC device is established. An application running on the open system desiring access to the information on the portable IC device authenticates itself to the portable IC device, proving that it is trustworthy. Once such trustworthiness is proven, the portable IC device authenticates itself to the application. Once such two-way authentication has been completed, trusted communication between the open system and the portable IC device can proceed, and private information that is maintained on the portable IC device can be unlocked and made available to the application.

15 Claims, 13 Drawing Sheets

U.S. PATENT DOCUMENTS

| | | | |
|---|---|---|---|
| 5,473,692 | A | 12/1995 | Davis |
| 5,491,827 | A | 2/1996 | Holtey |
| 5,544,246 | A | 8/1996 | Mandelbaum et al. |
| 5,557,518 | A | 9/1996 | Rosen |
| 5,557,765 | A | 9/1996 | Lipner et al. |
| 5,623,637 | A | 4/1997 | Jones et al. |
| 5,654,746 | A | 8/1997 | McMullan, Jr. et al. |
| 5,664,016 | A | 9/1997 | Preneel et al. |
| 5,671,280 | A | 9/1997 | Rosen |
| 5,721,781 | A | 2/1998 | Deo et al. |
| 5,745,886 | A | 4/1998 | Rosen |
| 5,757,919 | A | 5/1998 | Herbert et al. |
| 5,796,824 | A | 8/1998 | Hasebe et al. |
| 5,802,592 | A | 9/1998 | Chess et al. |
| 5,812,662 | A | 9/1998 | Hsu et al. |
| 5,812,980 | A | 9/1998 | Asai |
| 5,841,869 | A | 11/1998 | Merklin et al. |
| 5,860,099 | A | 1/1999 | Milios et al. |
| 5,872,847 | A | 2/1999 | Boyle et al. |
| 5,892,900 | A | 4/1999 | Ginter et al. |
| 5,892,902 | A | 4/1999 | Clark |
| 5,892,904 | A | 4/1999 | Atkinson et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,919,257 | A | 7/1999 | Trostle |
| 5,920,861 | A | 7/1999 | Hall et al. |
| 5,933,498 | A | 8/1999 | Schneck et al. |
| 5,940,504 | A | 8/1999 | Griswold |
| 5,943,422 | A | 8/1999 | Van Wie et al. |
| 5,944,821 | A | 8/1999 | Angelo |
| 5,949,876 | A | 9/1999 | Ginter et al. |
| 5,953,502 | A | 9/1999 | Helbig, Sr. |
| 5,958,050 | A | 9/1999 | Griffin et al. |
| 5,963,980 | A | 10/1999 | Coulier et al. |
| 5,974,546 | A | 10/1999 | Anderson |
| 5,982,891 | A | 11/1999 | Ginter et al. |
| 5,991,399 | A | 11/1999 | Graunke et al. |
| 5,991,876 | A | 11/1999 | Johnson et al. |
| 6,006,332 | A | 12/1999 | Rabne et al. |
| 6,009,274 | A | 12/1999 | Fletcher et al. |
| 6,009,401 | A | 12/1999 | Horstmann |
| 6,026,166 | A | 2/2000 | LeBourgeois |
| 6,032,257 | A | 2/2000 | Olarig et al. |
| 6,038,551 | A | 3/2000 | Barlow et al. |
| 6,073,124 | A | 6/2000 | Krishnan et al. |
| 6,092,189 | A | 7/2000 | Fisher et al. |
| 6,105,137 | A | 8/2000 | Graunke et al. |
| 6,112,181 | A | 8/2000 | Shear et al. |
| 6,118,873 | A | 9/2000 | Lotspiech et al. |
| 6,138,119 | A | 10/2000 | Hall et al. |
| 6,148,083 | A | 11/2000 | Fieres et al. |
| 6,148,387 | A | 11/2000 | Galasso et al. |
| 6,148,402 | A | 11/2000 | Campbell |
| 6,157,721 | A | 12/2000 | Shear et al. |
| 6,175,917 | B1 | 1/2001 | Arrow et al. |
| 6,185,678 | B1 | 2/2001 | Arbaugh et al. |
| 6,185,683 | B1 | 2/2001 | Ginter et al. |
| 6,189,100 | B1 | 2/2001 | Barr et al. |
| 6,192,473 | B1 | 2/2001 | Ryan, Jr. et al. |
| 6,212,636 | B1 | 4/2001 | Boyle et al. |
| 6,223,284 | B1 | 4/2001 | Novoa et al. |
| 6,229,894 | B1 | 5/2001 | Van Oorschot et al. |
| 6,230,285 | B1 | 5/2001 | Sadowsky et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,263,431 | B1 | 7/2001 | Lovelace et al. |
| 6,272,629 | B1 | 8/2001 | Stewart |
| 6,292,569 | B1 | 9/2001 | Shear et al. |
| 6,308,317 | B1 | 10/2001 | Wilkinson et al. |
| 6,327,652 | B1 | 12/2001 | England et al. |
| 6,327,660 | B1 | 12/2001 | Patel |
| 6,330,588 | B1 | 12/2001 | Freeman |
| 6,338,139 | B1 | 1/2002 | Ando et al. |
| 6,341,373 | B1 | 1/2002 | Shaw |
| 6,363,486 | B1 | 3/2002 | Knapton, III |
| 6,363,488 | B1 | 3/2002 | Ginter et al. |
| 6,367,012 | B1 | 4/2002 | Atkinson et al. |
| 6,381,741 | B1 | 4/2002 | Shaw |
| 6,389,402 | B1 | 5/2002 | Ginter et al. |
| 6,389,537 | B1 | 5/2002 | Davis et al. |
| 6,427,140 | B1 | 7/2002 | Ginter et al. |
| 6,449,367 | B1 | 9/2002 | Van Wie et al. |
| 6,477,252 | B1 | 11/2002 | Faber et al. |
| 6,477,648 | B1 | 11/2002 | Schell et al. |
| 6,480,961 | B1 | 11/2002 | Rajasekharan et al. |
| 6,560,706 | B1 | 5/2003 | Carbajal et al. |
| 6,609,199 | B1 * | 8/2003 | DeTreville ............... 713/172 |
| 6,640,304 | B1 | 10/2003 | Ginter et al. |
| 6,735,696 | B1 | 5/2004 | Hannah |
| 6,820,063 | B1 | 11/2004 | England et al. |
| 2002/0007452 | A1 | 1/2002 | Traw et al. |
| 2002/0069365 | A1 | 6/2002 | Howard et al. |
| 2002/0107803 | A1 | 8/2002 | Lisanke et al. |
| 2002/0120936 | A1 | 8/2002 | Del Beccaro et al. |
| 2002/0152173 | A1 | 10/2002 | Rudd |

FOREIGN PATENT DOCUMENTS

| | | |
|---|---|---|
| GB | 2260629 | 4/1993 |
| JP | 1040172 | 2/1998 |
| WO | WO9938070 | 7/1999 |

OTHER PUBLICATIONS

"Facing an Internet Security Minefield,Microsoft Hardens NT Server Defenses", Young R., Windows Watcher, Sep. 12, 1997, vol. 7, Issue 9, p1, 6p, 1 chart.

"Phoenix Technologies Partners with Secure Computing in Enterprise Security Marketplace", Jul. 12, 2001, Business Wire, Courtesy of Dialog Text Search, pp. 1-2.

Murphy et al., "Preventing Piracy: Authorization Software May Ease Hollywood's Fear of the Net", Internet World Magazine, Apr. 1, 2000, 3 pages.

"Internet Security: SanDisk Products and New Microsoft Technology Provide Copy Protected Music for Internet Music Player Market. (Product Annoucement)", Edge: Work Group Computing Report, Apr. 19, 1999, 2 pages.

Arbaugh et al., "A Secure and Reliable Bootstrap Architecture", Distributed Systems Laboratory, Philadelphia, Pa, 1997, pp. 65-71.

Lampson et al., "Authentication in Distributed Systems: Theory and Practice", Digital Equipment Corporation, ACM Transactions on Computer Systems, vol. 10, No. 4, Nov. 1992, pp. 265-310.

Clark et al., "Bits: A Smartcard Protected Operating System", Communications of the ACM, vol. 37, No. 11, Nov. 1994, pp. 66-70, 94.

Yee, "Using Secure Coprocessors", School of Computer Science, Carnegie Mellon University, 1994, 104 pgs.

Abadi et al., "Authentication and Delegation with Smart-cards", Jul. 30, 1992, 30 pgs.

Schneier, B., "Applied Cryptography", Applied Cryptography. Protocols, Algorithms, and Source Code in C, 1996, pp. 574-577.

"The TrustNo 1 Cryptoprocessor Concept", Markus Kuhn, Apr. 30, 1997, 6 pages.

"Seybold Report on Internet Publishing", Matt Mckenkie, vol. 1, No. 4, p6(9), Dec. 1996, 12 pages.

Stallings, Crytography and Network Security, 1999, Prentice Hall, 2nd Edition, pp. 143-147.

Feiertag, et al., "The foundations of a provably secure operating system (PSOS)", California Proceedings of the National Computer Conference AFIP Press, 1979, pp. 329-334.

* cited by examiner

METHOD AND APPARATUS FOR AUTHENTICATING AN OPEN SYSTEM APPLICATION TO A PORTABLE IC DEVICE

RELATED APPLICATIONS

This is a continuation of application Ser. No. 10/619,153, filed Jul. 14, 2003 now U.S. Pat No. 7,010,684, entitled "Method and Apparatus for Authenticating an Open System Application to a Portable IC Device", which is hereby incorporated by reference. Application Ser. No. 10/619,153 is a continuation of application Ser. No. 09/287,699, filed Apr. 6, 1999, entitled "Method and Apparatus for Authenticating an Open System Application to a Portable IC Device", now U.S. Pat. No. 6,609,199, which is hereby incorporated by reference, and which is a continuation-in-part of application Ser. No. 09/266,207, filed Mar. 10, 1999, entitled "System and Method for Authenticating an Operating System to a Central Processing Unit, Providing the CPU/OS with Secure Storage, and Authenticating the CPU/OS to a Third Party", which claims the benefit of U.S. Provisional Application No. 60/105,891, filed Oct. 26, 1998, entitled "System and Method for Authenticating an Operating System to a Central Processing Unit, Providing the CPU/OS with Secure Storage, and Authenticating the CPU/OS to a Third Party".

TECHNICAL FIELD

This invention relates to computer-implemented authentication systems. More particularly, the invention relates to authentication of an application, running on an open system, to a portable IC device.

BACKGROUND OF THE INVENTION

Computers are finding more and more uses in a wide variety of fields and locations. The ability to obtain ever-increasing performance at an ever-decreasing price is expanding the fields where computers can be used. These reduced costs make "public" computers more and more plausible. Public computers refer to computers that are set up and generally available for use by the public, such as in a hotel room, in a kiosk at an airport or shopping mall, in a store (e.g., a department or grocery store), etc. Such public computers may be interconnected with other computers, such as other public computers via a local area network (LAN) or other public and/or non-public computers via a wide area network (WAN) such as the Internet, or alternatively may be stand-alone computers.

The public accessibility to such computers, as well as their potential interconnectivity, makes each computer an "open system". An open system refers to a computer that is accessible to multiple individuals and/or other computers, some of which cannot be trusted with users' private information. Open systems are vulnerable to a wide variety of attacks intended to compromise the integrity of the systems and reveal users' private information. Such attacks can come from other computers via a network (e.g., the Internet), or alternatively from other users of the systems.

Public computers are particularly appealing for use with portable integrated circuit (IC) devices such as smart cards. A smart card is a small card, roughly the size of a typical credit card, that includes a microprocessor, memory, and an input/output (I/O) interface. Smart cards can be programmed to maintain any type of information. Examples of such information include private financial information (such as checking or savings account number, credit card numbers, and personal identification numbers (PINs)), as well as private identification information (such as a social security number or digital signature).

Unfortunately, when public computers are vulnerable to attack, so too are the smart cards that interface with the computers. A public computer could be executing, unbeknownst to the user, a "rogue" application that accesses private information on the smart card and subsequently takes various unauthorized actions. Examples of such unauthorized actions include charging goods or services to a particular account number and signing the smart card owner's signature to the charges, transferring money out of checking or savings accounts, etc. Another type of rogue application executing on the public computer could be an "imposter" of a legitimate program. For example, a public computer may include a banking program that allows users, upon providing the appropriate account numbers from their smart card, to access their current account status or purchase goods and services. A rogue application may pretend to be the banking application in order to receive the account numbers provided by the smart card, at which point various unauthorized actions could be taken by the rogue application.

Similarly, a rogue OS (operating system) might intercept a PIN (Personal Identity Number) or other smart card password entered on the open system's keyboard, or might intercept communications between the smart card and the application operating under the OS's control on the open system.

One solution that protects private information from rogue applications is to include, as part of the portable IC device, a display in order to display the requests being signed by the smart card on behalf of the user, a keyboard in order to allow the user to enter PINs and to accept or reject requests, and its own clock and battery supply to provide defense against various other attempts to obtain the private information. However, this solution provides a rather bulky and expensive "portable" IC device that is too costly to produce on a mass scale.

This invention addresses these disadvantages, providing an improved way to maintain the security of private information on a portable IC device.

SUMMARY OF THE INVENTION

The invention provides for authentication between an open system and a portable IC device that can be coupled to the open system. Private or otherwise sensitive or protected information that is maintained on the portable IC device is unlocked and made available only to an application, executing on the open system, that can prove to the portable IC device that it is trustworthy. The trustworthy application will maintain the security of the private information and will not misuse the information.

According to one aspect of the invention, a secure communication channel between the open system and the portable IC device is established. An application desiring access to the information on the portable IC device then authenticates itself to the portable IC device, proving that it is trustworthy. Once such trustworthiness is proven, the portable IC device authenticates itself to the application. Once such two-way authentication has been completed, trusted communication between the open system and the portable IC device can proceed.

According to one aspect of the invention, the open system uses an "authenticated boot" methodology to authenticate applications executing on the system. In the authenticated boot methodology, certificates of authenticity can be provided by the operating system, the processor, and the computer. The operating system can further provide certificates authenticating particular applications executing on the open system. A chain of such certificates can then be provided to the portable IC device, proving the authenticity of the applications.

According to another aspect of the invention, the open system uses a "curtaining" or "curtained code" methodology to authenticate applications executing on the system. In the curtaining methodology, an application can be executed in a secure manner by the open system, ensuring that no other applications can access the data being used by the secure application unless explicitly authorized. A security manager, responsible for handling secure sections of memory, can provide a certificate that a particular application is executing in a secure section of memory, thereby proving the authenticity of the application.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The discussion herein assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

General System Structure

Figure 1:
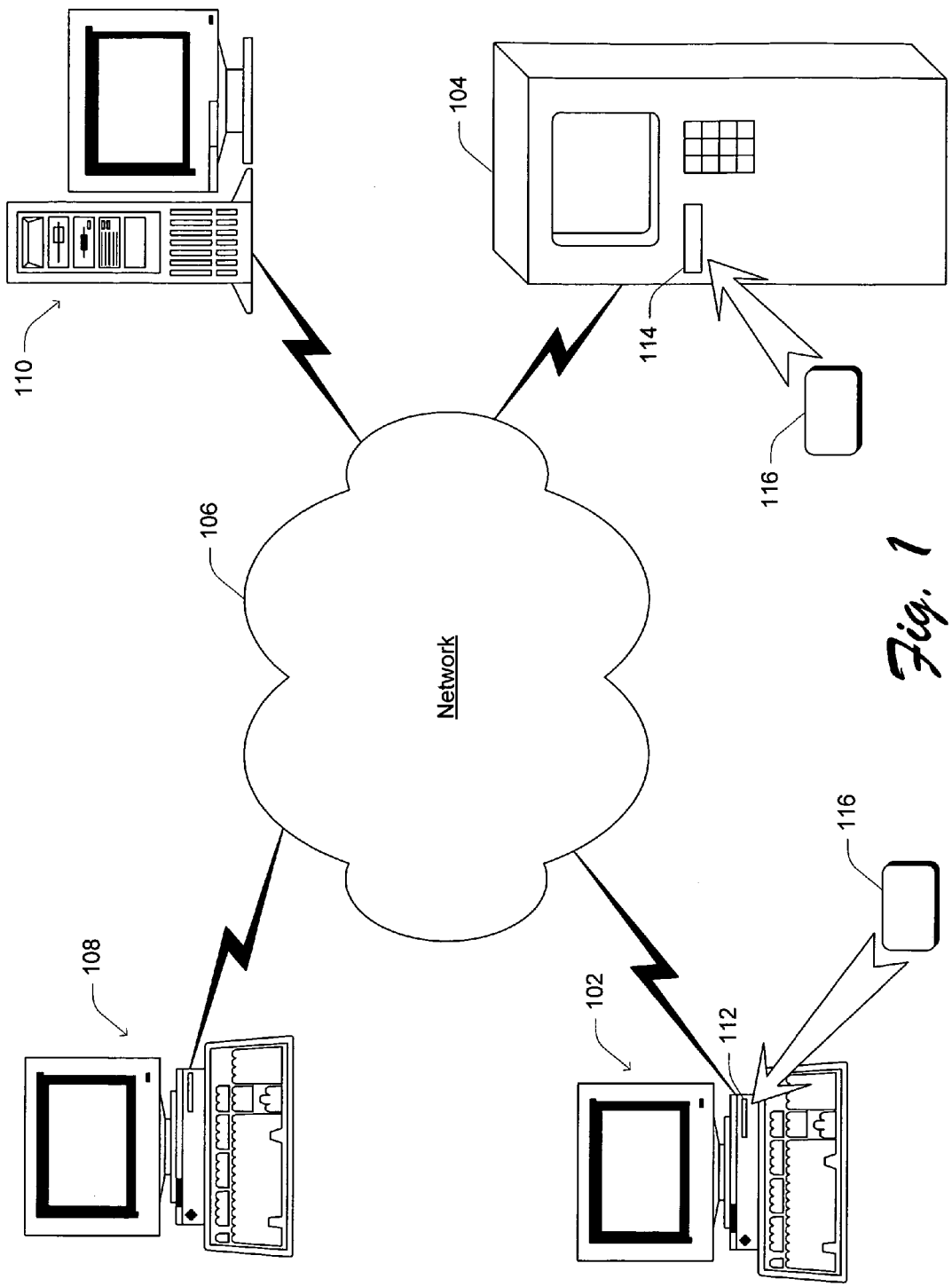
FIG. 1 is a block diagram illustrating an exemplary system incorporating the invention.

FIG. 1 is a block diagram illustrating an exemplary system incorporating the invention. Generally, the system includes multiple open system computers 102 and 104 coupled to a data communications network 106. The communications network 106 comprises a public and/or private network(s), such as the Internet, a local area network (LAN) or wide area network (WAN). Additional open system computers 108 or server computers 110 may also be coupled to communications network 106, enabling communication among computers 102, 104, 108, and 110. Each of the open system computers 102–108 can be a public computer that is generally accessible by the public.

Computers 102 and 104 include access ports 112 and 114, respectively. Access ports 112 and 114 allow a portable integrated circuit (IC) device, such as device 116, to be communicably coupled to computers 102 and 104 (e.g., device 116 may be inserted into ports 112 and 114). This coupling can be accomplished in any of a variety of conventional manners. Examples of such couplings include physical couplings (e.g., electrical contacts on the device 116 that are aligned, when the card is inserted into ports 112 or 114, with electrical contacts in ports 112 and 114), wireless couplings (e.g., an infrared (IR) connection), etc.

By coupling an IC device 116 to one of the computers 102 or 104, a user is able to access his or her private information on device 116, or private information maintained on another computer or server, or perform other restricted actions. For example, a user may access his or her bank account, or alternatively order products or services and "sign" the order using IC device 116. Such uses for portable IC devices are well-known to those skilled in the art and thus will not be discussed further except as they pertain to the invention.

Portable IC device 116 can be any of a wide variety of portable devices. One such portable device is a smart card, having approximately the same dimensions as a conventional credit card. Device 116 can alternatively be implemented as other types of portable devices, such as jewelry (e.g., a pendant, ring, or necklace), electronic devices (e.g., a pocket organizer or cellular phone), watches, etc.

When IC device 116 is coupled to one of computers 102 or 104, the IC device 116 authenticates itself to the computer in order to ensure the computer that device 116 itself is indeed present. This authentication of IC device 116 also ensures to the computer that the proper user of the device 116 is present (e.g., the device 116 has not been stolen). Additionally, in accordance with the invention one or more applications running on the computer are authenticated to IC device 116. The authentication of the application(s) ensures to IC device 116 that the application is trusted to not improperly access or use confidential information obtained from IC device 116.

One or more software application(s) running on computer 102 or 104 can be authenticated to portable IC device 116 using different methodologies. One way to support such authentication is referred to as "authenticated boot". Using the authenticated boot methodology, the operating system on the computer is able to prove its identity to the microprocessor and thereby certify that it is trusted. The operating system can then certify other applications that are to be trusted. Another way to support such authentication is referred to as "curtaining" or "curtained code". Using the curtaining methodology, trusted applications can be executed in a secure manner regardless of the trustworthiness of the operating system. A security manager coordinates such execution, and can provide certificates proving that particular applications are executing in a secure manner. Both the authenticated boot and curtaining methodologies are discussed in more detail below.

Figure 2:
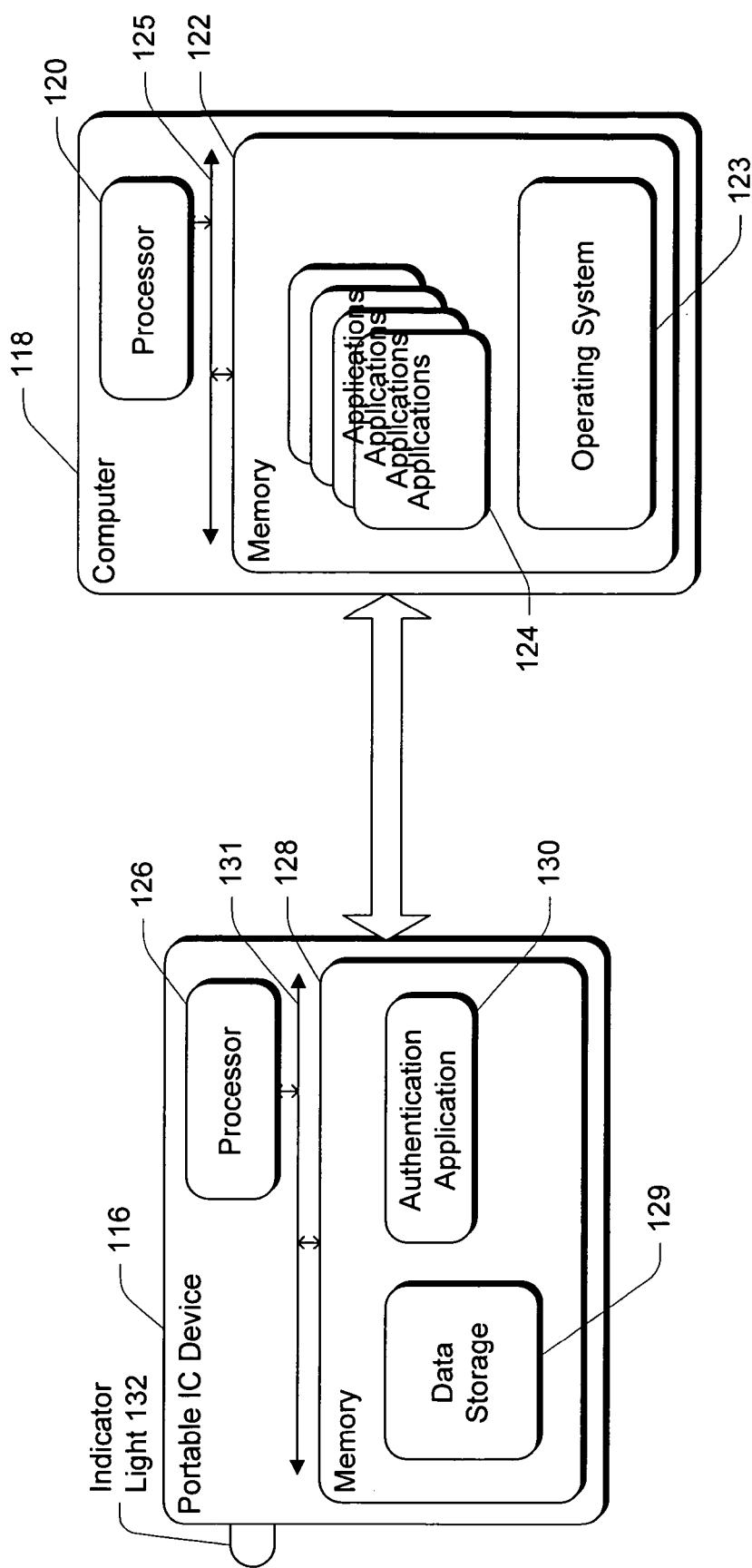
FIG. 2 is a block diagram illustrating an exemplary computer and portable IC device in accordance with the invention.

FIG. 2 is a block diagram illustrating an exemplary computer and portable IC device in accordance with the invention. The computer 118 represents an open system computer, such as computer 102 or 104 of FIG. 1. Computer 118 includes a processor 120 and memory 122 storing an operating system (OS) 123 and multiple applications 124, coupled together by an internal or external bus 125. Memory 122 represents any of a variety of conventional volatile and/or nonvolatile memory or storage components, such as read only memory (ROM), random access memory (RAM), magnetic storage (e.g., tapes, or floppy or hard disks), optical disks (e.g., CD-ROMs or DVDs), etc. Any one or more of applications 124 or operating system 123 may request that portable IC device 116 unlock itself, thereby allowing the requesting application or operating system to access private information stored on the portable IC device.

Portable IC device 116 includes a processor 126 and memory 128 having a data storage section and an authentication application 130, coupled together by an internal bus 131. Memory 128 represents any of a variety of conventional nonvolatile storage components, such as ROM or flash memory. Alternatively, if portable IC device 116 were to have a separate power source (e.g., a small battery), memory 128 could also include volatile memory. Data storage 129 includes the user's private information. Authentication application 130 is an application that interacts with the application(s) 124 and/or operating system 123 of computer 118 to determine whether to unlock the portable IC device 116 and thereby make the information in data storage 129 available to the requesting application of computer 118. Portable IC device 116 will not provide any data in data storage 129 to applications 124 or operating system 123 until the requesting application or operating system is authenticated. An optional indicator light 132 or other signaling device is used to inform the user that the computer 116 has appropriately authenticated itself to the portable IC device 116. The operation of authentication application 130 is discussed in more detail below.

Authenticated Boot

Figure 3:
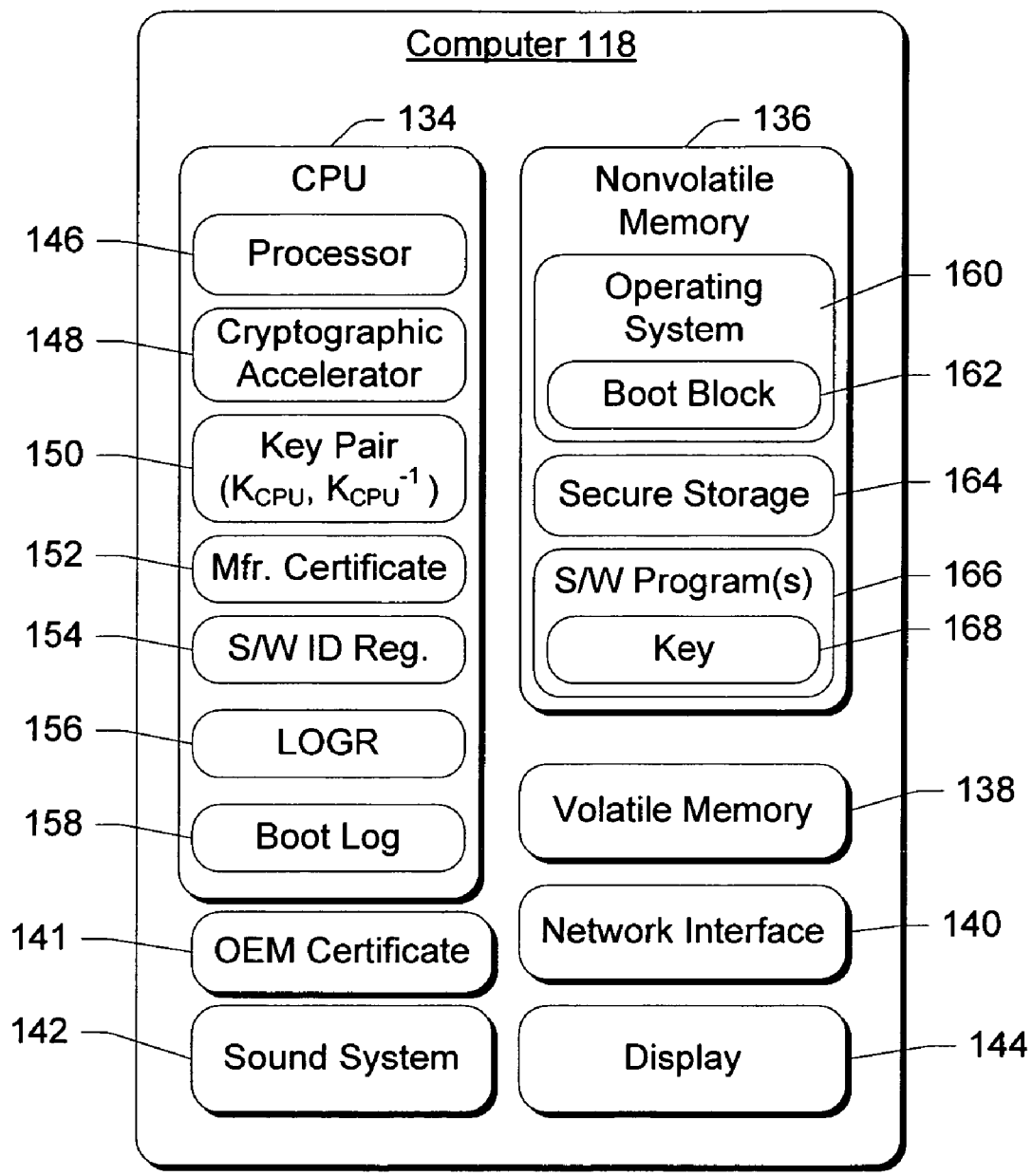
FIG. 3 shows general components in an exemplary open system computer.

FIG. 3 shows general components in an exemplary computer 118 of FIG. 2. They include a central processing unit (CPU) 134, nonvolatile memory 136 (e.g., ROM, disk drive, CD ROM, etc.), volatile memory 138 (e.g., RAM), a network interface 140 (e.g., modem, network port, wireless transceiver, etc.), and an OEM certificate 141 whose use is described below. The computer 118 may also include a sound system 142 and/or a display 144. These components are interconnected via conventional busing architectures, including parallel and serial schemes (not shown).

The CPU 134 has a processor 146 and may have a cryptographic accelerator 148. The CPU 134 is capable of performing cryptographic functions, such as signing, encrypting, decrypting, and authenticating, with or without the accelerator 148 assisting in intensive mathematical computations commonly involved in cryptographic functions.

The CPU manufacturer equips the CPU 134 with a pair of public and private keys 150 that is unique to the CPU. For discussion purposes, the CPU's public key is referred to as "$K_{CPU}$" and the corresponding private key is referred to as "$K_{CPU}^{-1}$". Other physical implementations may include storing the key on an external device to which the main CPU has privileged access (where the stored secrets are inaccessible to arbitrary application or operating system code). The private key is never revealed and is used only for the specific purpose of signing stylized statements, such as when responding to challenges from a portable IC device, as is discussed below in more detail.

The manufacturer also issues a signed certificate 152 testifying that it produced the CPU according to a known specification. Generally, the certificate testifies that the manufacturer created the key pair 150, placed the key pair onto the CPU 134, and then destroyed its own knowledge of the private key "$K_{CPU}^{-1}$". In this way, nobody but the CPU knows the CPU private key $K_{CPU}^{-1}$; the same key is not issued to other CPUs. The certificate can in principle be stored on a separate physical device but still logically belongs to the processor with the corresponding key.

The manufacturer has a pair of public and private signing keys, $K_{MFR}$ and $K_{MFR}^{-1}$. The private key $K_{MFR}^{-1}$ is known only to the manufacturer, while the public key $K_{MFR}$ is made available to the public. The manufacturer certificate 152 contains the manufacturer's public key $K_{MFR}$, the CPU's public key $K_{CPU}$, and the above testimony. The manufacturer signs the certificate using its private signing key, $K_{MFR}^{-1}$, as follows:

Mfr. Certificate=($K_{MFR}$, Certifies-for-Boot, $K_{CPU}$), signed by $K_{MFR}^{-1}$ The predicate "certifies-for-boot" is a pledge by the manufacturer that it created the CPU and the CPU key pair according to a known specification. The pledge further states that the CPU can correctly perform authenticated boot procedures, as are described below in more detail. The manufacturer certificate 152 is publicly accessible, yet it cannot be forged without knowledge of the manufacturer's private key $K_{MFR}^{-1}$.

Another implementation in which a 'chain of certificates' leading back to a root certificate held by the processor manufacturer is also acceptable.

Similarly, the OEM (Original Equipment Manufacturer), the manufacturer of the computer as distinguished from the manufacturer of the processor, may provide an OEM certificate 141 that certifies that the design of the computer external to the processor does not include various known attacks against the secure operation of the processor. The OEM also has a pair of public and private signing keys, $K_{OEM}$ and $K_{OEM}^{-1}$. The OEM certificate is signed using the private key $K_{OEM}^{-1}$ analogous to the manufacturer's certificate 152 being signed by the processor manufacturer.

The CPU 134 has an internal software identity register (SIR) 154, which is cleared at the beginning of every boot. The CPU executes an opcode "BeginAuthenticatedBoot" or "BAB" to set an identity of a corresponding piece of software, such as operating system 160, and stores this identity in the SIR; the boot block of the operating system (described below) is atomically executed as part of the BAB instruction. If execution of the BAB opcode and the boot block fails (e.g., if the execution was not atomic), the SIR 154 is set to a predetermined false value (e.g., zero). This process is described below in more detail with reference to FIG. 5.

The CPU 134 also utilizes a second internal register (LOGR) 156, which holds contents produced as a result of running a LOG operation. This operation, as well as the register, is described below in more detail.

The CPU 134 also maintains a "boot log" 158 to track software modules and programs that are loaded. In one implementation, the boot log 158 is a log in an append-only memory of the CPU that is cleared at the beginning of every boot. Since it consumes only about a few hundred bytes, the boot log 158 can be comfortably included in the main CPU. Alternatively, the CPU 134 can store the boot log 158 in volatile memory 138 in a cryptographic tamper-resistant container.

A further implementation is by means of a software module that allows each section of the booting operating system to write entries into the boot log that cannot be removed by later components without leaving evidence of tampering. Yet alternatively, the SIR can hold a cryptographic digest of a data structure comprising the initial boot block and the subsequent contents of the boot log. The operation of appending to the boot log (call this operation "Extend") replaces the SIR with the hash of the concatenation of the SIR and the entry being appended to the boot log. A straightforward implementation of this operation may be seen to modify the SIR. Note, however, that the operating system, when booting, can choose to add elements to the boot log without loading the corresponding components, and so a more privileged combination of software components can impersonate a less privileged one. This allows the controlled transfer of secrets across privilege levels. In this approach, software will keep its own plaintext copy of the boot log entries, along with the initial value of the SIR following boot, and this plaintext copy is validated by knowledge of the current composite SIR.

As an optimization, regardless of the implementation of the boot log, the OS may choose not to extend the boot log with the identities of certain software components, if these components are judged to be as trustworthy as the OS itself, or if they will execute only in a protected environment from which they will be unable to subvert operation.

The operating system (OS) 160 is stored in the memory 136 and executed on the CPU 134. The operating system 160 has a block of code 162 used to authenticate the operating system on the CPU during the boot operation. The boot block 162 uniquely determines the operating system, or class of operating systems (e.g. those signed by the same manufacturer). The boot block 162 can also be signed by the OS manufacturer.

Figure 4:
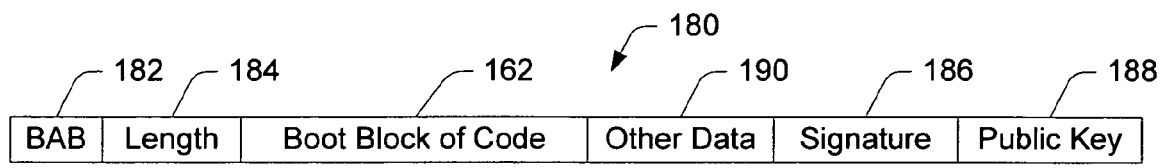
FIG. 4 shows an example of a signed boot block.

FIG. 4 shows an example of a signed boot block 180 created by signing the block of code 162. It contains the BeginAuthenticatedBoot opcode 182, a length 184 specifying the number of byte in the block of code, the code 162, a signature 186, and a public key 188 used to verify the signature 186. The boot block will also contain as a constant or set of constants, keys, or other information 190 that is used to validate the subsequent operating system components (for instance a public key or keys). In this implementation, the CPU will set the SIR to the public key of the boot block, but only if the boot block code signature is correct for the stated boot block public key.

In an alternative implementation, the SIR is set to the cryptographic hash or digest of the code and constants that make up the boot block. The signature 186 and public key 188 are then not needed.

A key observation of both of these implementations is that no one can boot an untrusted operating system in which the SIR is set to the value of a trusted operating system.

Once booted the operating system 160 and other selected applications (e.g., banking applications) named in an access control list (ACL) by the owner of the computer can set aside space 164 in memory or disk 136 to hold private or confidential data in a secure manner, without fear of other operating systems or rogue applications reading the data in the space. The private data is protected by encryption using a key that is generated based in part upon a seed supplied by an authenticated and trusted OS, in part by a secret key stored in the CPU, and in part by the software identity register (SIR). The private data is stored with an ACL naming the applications that can use the data and the terms under which they can use it.

Software programs 166 (the applications) are also shown stored in memory 136. These programs may interact with the portable IC device 116. Each program 166 has an associated key or digest 168 for unique identification.

The authenticated boot process allows any software at any point in the boot sequence to initiate an authenticated boot.

Figure 5:
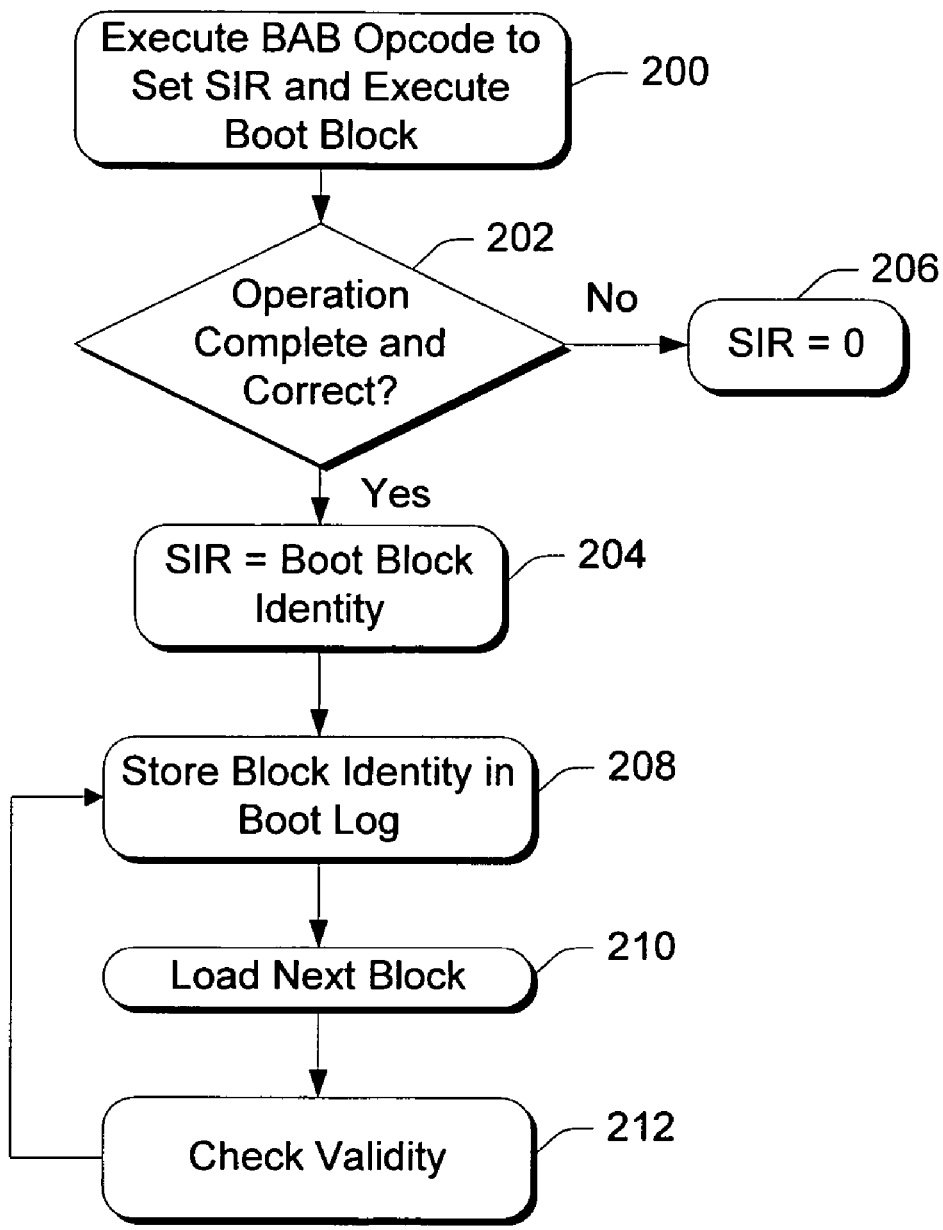
FIG. 5 shows steps in a method for performing an authenticated boot operation.

FIG. 5 shows steps in a method for performing an authenticated boot operation on the operating system 160. These steps are performed by the CPU 134 and OS 160 resident in the computer 118. At step 200, the CPU executes the BeginAuthenticatedBoot opcode 182 in the signed boot block 180 to set an identity for the operating system 160. The identity can be a digest of the boot block's opcodes and data, or the public key 188 corresponding to a signature on the boot block of the operating system.

The BeginAuthenticatedBoot opcode 182 and the boot block 180 execute as one atomic operation, with the implication that if they execute completely and correctly, the resulting operating system can be trusted. Measures are taken to ensure that the CPU is not interrupted and that the boot code that has just been validated cannot be modified. This can involve locking the memory bus and switching off interrupts. It could also involve having the CPU watch for interrupts or for writes by other bus agents and invalidate the authenticated boot sequence if they occur. The BAB opcode 182 can be executed at any time, with one exemplary time being at the start of the OS loader, right after the OS-selector executes. An alternative implementation is to provide both a BeginAuthenticatedBoot (BAB) and an EndAuthenticatedBoot (EAB) instruction. The BAB instruction computes the secure hash of the boot block and the EAB instruction sets the SIR if the execution of the boot block was not interrupted or potentially modified by memory writes from another processor or another bus master.

Execution of the BeginAuthenticatedBoot opcode 182 sets the internal software identity register 158 to either (1) the OS's identity (i.e., boot block digest or OS public key 188) if the operation is successful, or (2) zero if some event or circumstance has potentially subverted operation. Assuming the operation is successful (i.e., the "yes" branch from step 202), the SIR 154 is now a unique number or other value that represents the identity of the operating system 160 (step 204). Any two processors running the same operating system will produce the same SIR. If the BAB opcode operation is unsuccessful (i.e., the "no" branch from step 202), the SIR is set to zero (step 206).

It is noted that different operating systems may be serially booted on the computer 118. Executing the BAB opcode 182 for different signed OS boot blocks results in different SIR values. However, it is possible for multiple boot blocks to result in the same SIR, when desired.

At step 208, the CPU 134 fills the first entry on the boot log 158 with the public key (or digest) of the boot block 162. From now on, any running code can append data to the boot log 158, and it is generally used by code in the boot chain to identify code versions as they are loaded and executed. As noted earlier, appending data to the boot log can be simulated by modifying the SIR via the "Extend" operation.

The boot block 162 is free to load the next set of blocks in the boot-chain (step 210). At step 212, the boot block 162 checks the validity of the modules (by signature or other means) and loads them so that they can be executed. An identity for each module is appended to the boot log 158. The OS will also retain additional information on components that it loads (e.g., version numbers, device driver IDs, etc.). Loading and executing the code may result in loading more code, validating it, and executing it, etc. This process continues through to the loading of device drivers. When the boot sequence is complete, the OS is operational and the software identity register and the boot log store non-modifiable data captured during the boot sequence. Loading new device drivers can be recommenced at any point, possibly causing the operating system to become less privileged, with the possible termination of access to private data.

Figure 6:
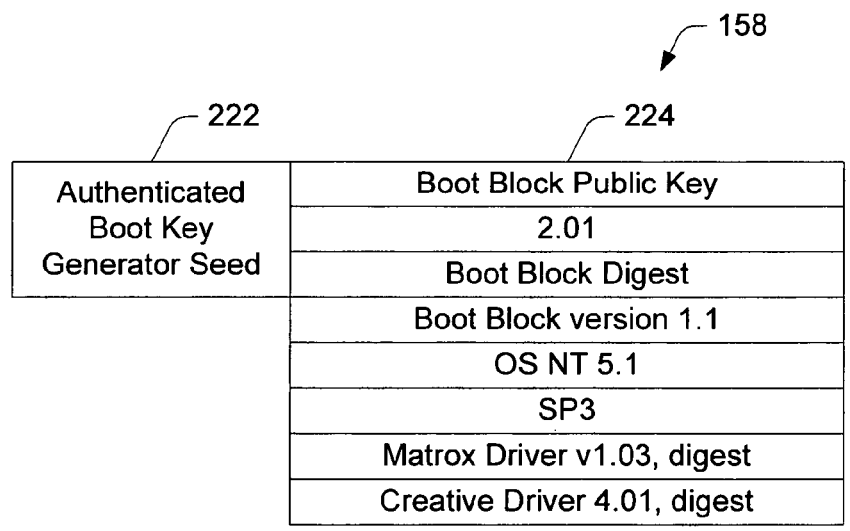
FIG. 6 shows an exemplary structure of a boot log.

The CPU can generate a signed certificate containing the boot log data to attest to the particular operating system (including drivers) that is running. It could also generate a signed statement containing just the SIR. FIG. 6 shows an exemplary structure of a boot log 158. It contains a seed field 222 and a block ID field 224. The block ID field 224 holds identities of the blocks of code that are loaded and verified on the subscriber unit. The block ID field 224 can hold text or binary data.

The SIR or the seed field 222 holds an authenticated boot key generator seed. The CPU uses the seed in field 222 to generate keys unique to the OS and processor. Since the first entry of the boot log 158 can only be generated by the execution of a particular boot block or the holder of the boot block private key, the keys can only be re-generated by the same OS, or another OS from the same publisher under control of the publisher.

Once the CPU has derived an appropriate SIR for the operating system, the combination of the CPU and the OS has a unique identification that may be presented to third parties. The computer 118 is thus prepared to communicate with a portable IC device, to specify the CPU and the OS, and prove the identity of the CPU and operating system to the portable IC device.

The action of signing a statement of the current value of the SIR can be generalized into a technique for the operating system to make a signed attestation of the current value of any arbitrary region of memory and/or a register. In one implementation, the ATTEST operation is performed as follows:

ATTEST(Register Name, Region of Memory)
This operation produces a signed result:
[$K_{CPU}$, "ATTEST", Register Name, Register Value, Memory Contents](signed with $K_{CPU}^{-1}$)

The ATTEST operation can be used to sign the current value of the SIR or any other register (including a log register LOGR, described below). The processor also signs the data contained in an arbitrary region of memory. This can be used to include the challenge value or some other signed statement desired by the operating system or application. The ATTEST operation can be used to provide an implementation of a more general form of OS certificates.

The boot log is an append-only record of all or selected components loaded by the operating system. This can be managed entirely in hardware, but can be simplified by means of a LOG operation.

The LOG operation constructs a secure one way digest of a supplied parameter, an internal LOGR register 156, and stores the result back in the LOGR register. At power up, or at processor reset, the LOGR register is set to zero. The LOGR register can be read, but not written apart from execution of the LOG operation. The processor can also sign a statement attesting to the current value of the LOGR register and a supplied challenge. Symbolically:

$$LOGR' = SHA\text{-}1(LOGR, DATA) \quad (1)$$

where LOGR is the current value of the register, DATA is supplied to the LOGR' and is the contents of the LOGR register after the LOG operation is performed, and SHA-1 is an exemplary one way hash function (the Secure Hash Algorithm).

The operating system can use the LOG operation to record the digest of each component as it is loaded. When communicating with a portable IC device, the ATTEST operation can be used to provide an un-tamperable attestation of all components loaded into the operating system.

In order for the portable IC device to be able to interpret the LOGR value, the operating system also conveys the digests of all components that made up the boot log. The portable IC device can then:

1. Check that all of the components revealed are known and trusted.
2. Check that the composite value obtained when the digests are combined according to equation (1) match that quoted by the microprocessor.
3. Check that the signature on the quoted statement is valid for the microprocessor public key.
4. Check that the processor certificate and OEM certificate are valid and correspond to the processor key used in the quoted statement.

If these conditions are met, the portable IC device can trust the client with the confidential data. If they are not met, then the portable IC device can return a statement of the components that are not trusted so that the administrator of the open system can upgrade the untrusted component(s).

The fundamental requirements of atomicity and privileged access to keys for the microcode that implements authenticated boot can be met in a variety of alternative implementations. In one implementation, components in the chipset may examine the bus to infer operation and permit or deny access to keys depending on the code executing. Components on the chipset can also examine the bus for unauthorized agents writing to protected code, or reading unauthorized secrets.

An agent on the bus can also check for unauthorized interrupts during the execution of the authenticated operations or execution of the boot block.

Similarly, there is no fundamental requirement for the microcode that implements the authenticated boot operations to be physically resident on the microprocessor chip. It could also be stored in ROM, EPROM, or protected flash memory in a physically separate device on the bus.

The authenticated boot technique can be implemented by existing CPU operating modes using code in the computer's BIOS code. The System Management Mode (SMM), supported by Intel microprocessors, provides for a region of memory that is inaccessible to normal operating system operation, but can provide subroutines that operating systems or applications can use. Such SMM protected memory could be used for the storage of keys and the code that manages those keys.

Hash algorithms and signature schemes can be broken. One example of a security break is that an attacker finds a second boot block that has the same identity (same signature, or same digest). If such a boot block is found, then a different operating system can be booted, and all data security is lost.

Greater security can be obtained by combining security schemes. For instance, the OS-identity can be formed as the concatenation of two or more digests calculated using different hash algorithms, or the same algorithm applied to boot block data in a different order (for instance, backwards).

In the case of signature based identity, the boot block can be signed several times using different signature algorithms and keys. Again the software identity becomes the concatenation of the relevant public keys. This technique also provides protection against private key compromise. If one of the signing keys is compromised, not all security is lost.

Microprocessor key compromise is inevitable and is traditionally handled by revocation lists (list of untrusted hosts). However, if the certificates that vouch for the microprocessor keys never expire, then revocation lists will grow uncomfortably large. This problem can be ameliorated by finite lifetime processor certificates and OEM certificates. Portable IC devices will require valid certificates (not expired), and the chip vendors and OEMs (or other trusted parties) will be required to re-issue certificates for chips and computers still considered in good standing (not revoked). Note that the certificates are not used when offline, so machines do not stop working when the certificates expire. However, in online transactions, an occasional (probably automated) extra step would be to get a new certificate.

Curtained Code

Figure 7:
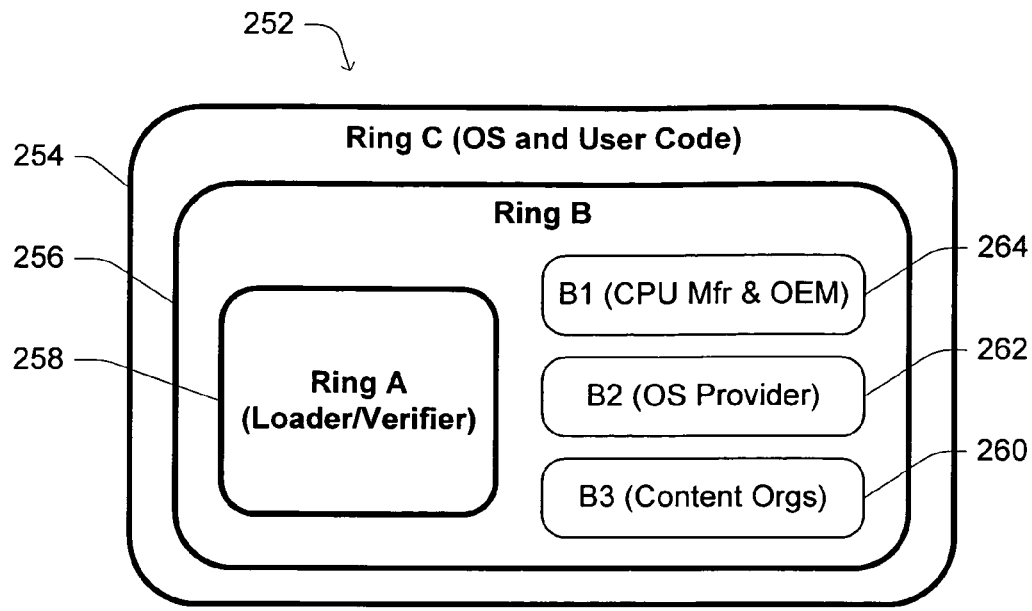
FIG. 7 is an example of a symbolic map of a memory space using curtaining.

FIG. 7 is a symbolic map of a memory space 252 in computer 118 of FIG. 2. For purposes of illustration, consider it to have a potential size of 4 Gbytes, so that 32 bits of address suffice to access all of it. Space 252 can exist in a single physical memory, or in several different kinds of storage, such as ROM, read/write RAM, flash RAM, and so forth. Also, partially or totally separate address spaces are a straightforward extension. Space 252 has three regions or rings 254, 256, and 258 relevant to the present discussion. Although the information stored in these rings can be similar to that contained in the rings sometimes used in processors that employ conventional privilege levels or operational modes, their mechanism is quite different and independent.

Ring 254 is called Ring C or the outer ring, and has only conventional protection or security against any kind of read or write access by any code located there or in the other rings in the present system, and normally occupies almost all of the available address space. All normal user-mode code and data resides in this ring. The operating system, including the kernel, also resides there. Ring C has no read or write access to the other two rings.

Rings 256 and 258 together comprise the secure or curtained region of memory. No program code in Ring C has any access to data within them. Ring C code, can, however, be provided some ability to initiate the execution of code located there, as described below. Conversely, any code in rings 256 and 258 has full conventional access to Ring C, including reading and writing data, and executing program code.

Ring 256, also called Ring B, has full access privileges to Ring C, but only restricted access to ring 258. Thus, it can have both semipermanent storage such as nonvolatile flash RAM for code routines and volatile read/write memory for temporary data such as keys. A megabyte or less of the total address range would likely suffice for Ring B.

Ring 258, also called Ring A or the inner ring, in turn has full access to Rings B and C for both code and data. It can also employ both nonvolatile and volatile technologies for storing code and data respectively. Its purpose is to store short loader and verifier programs and keys for authentication and encryption. The address space required by Ring A is generally much smaller than that of Ring B. That is, this exemplary embodiment has the Ring A address range within the address range of Ring B, which in turn lies within the address range of Ring C. The address ranges of the rings need not be contiguous or lie in a single block. In order to prevent the access restrictions of the curtained rings from being mapped away by a processor, the address ranges of Rings A and B can be treated as physical addresses only. In one embodiment, virtual addresses are conventionally translated into their corresponding real addresses, and then the restrictions are interposed at the level of the resulting real addresses. Alternatively, a mechanism could disable virtual addressing when certain addresses are accessed.

In the contemplated area of authentication of rights, it can be desirable to allow multiple parties to emplace their own separate authentication code and data that cannot be accessed by any of the other parties. For example, the manufacturer of the processor, the manufacturer of the computer, the provider of the operating system, and the provider of trusted application programs may all desire to execute their own authentication or other security routines and manage their own keys. At the same time, each party should be able to use code and data in the unsecure Ring C, and to execute certain routines in the inner Ring A. Dividing Ring B into peer subrings 260, 262, and 264 permits this type of operation. Region 260, called Subring B1, has the privileges and restrictions of Ring B, except that it cannot access subring 262 or 264.

Subring B1 can, however, access any part of Ring B that lies outside the other subrings. In this way, Subring B1 can function as though it were the only middle ring between Rings A and C. Subrings 262 (B2), and 264 (B3) operate in the same manner. A typical PC-based system might have three or four subrings, of 64–128 KBytes each. The code in these subrings is normally updated seldom, so that conventional flash memory is appropriate. Alternatively, the Ring-A loader could load the code and keys into RAM from an encrypted storage on disk on demand. Each subring will also require a small amount of scratch RAM, although rewritable flash memory might be suitable here as well; it might be desirable to use this for persisting the state of the system after a reboot. For extra flexibility, the memory available to the curtained memory subsystem can be allocated under the control of the Ring-A executive code. In order that no untrusted party can manipulate the memory map to reveal secrets, the map of the subrings in the Ring-B memory is kept in flash storage in curtained memory, under control of the curtained-memory controller in ring A.

In presently contemplated authentication procedures, Ring A code and keys are loaded under conditions in which protection against snoopers is not necessary; for example, they can be loaded when the microprocessor is manufactured. This simple step eliminates any requirement for building any cryptographic capabilities into the processor itself. Accordingly, Ring A code and keys can be stored in permanent ROM, with only a few hundred bytes of scratchpad RAM. This Ring A code is designed to load further curtained code and keys into ring B memory segments through a physically insecure channel, such as a public network, in such a manner that an eavesdropper, including even the owner of the target computer, cannot discover any secret information contained therein. This downloaded code, operating from the secure memory, then performs the authentication operations that users require before they will trust their valuable data to the rights-management software of the system. This bootstrapping procedure permits building a wide class of secure operations and associated secret keys with greater security than would be possible in traditional assembly code, even with some form of authentication routines.

However, there are no restrictions on the code that can be loaded into any of the Ring-B memory areas. Examples of Ring-B code include applications for key management, applications for interfacing with and accessing information on portable IC devices, secure storage, signing, and authentication. Further examples include electronic cash storage, a secure interpreter for executing encrypted code, modules for providing a software licenses necessary for a piece of software to run. It is also possible to load only a part of an application, such as a module that communicates with a media player in unsecure memory for reducing software piracy.

The foregoing shows how untrusted code can be prevented from accessing the contents of a secure memory. The trusted code that is permitted to perform secure operations and to handle secret data is called curtained code. In other systems, such code must be executed within a privileged operating mode of the processor not accessible to non-trusted software, or from a separate secure processor. In the present invention, however, curtained code can only be executed from particular locations in memory. If this memory is made secure against intrusion, then the curtained code can be trusted by third parties. Other features restrict subversion through attempts at partial or modified execution of the curtained code.

Figure 8:
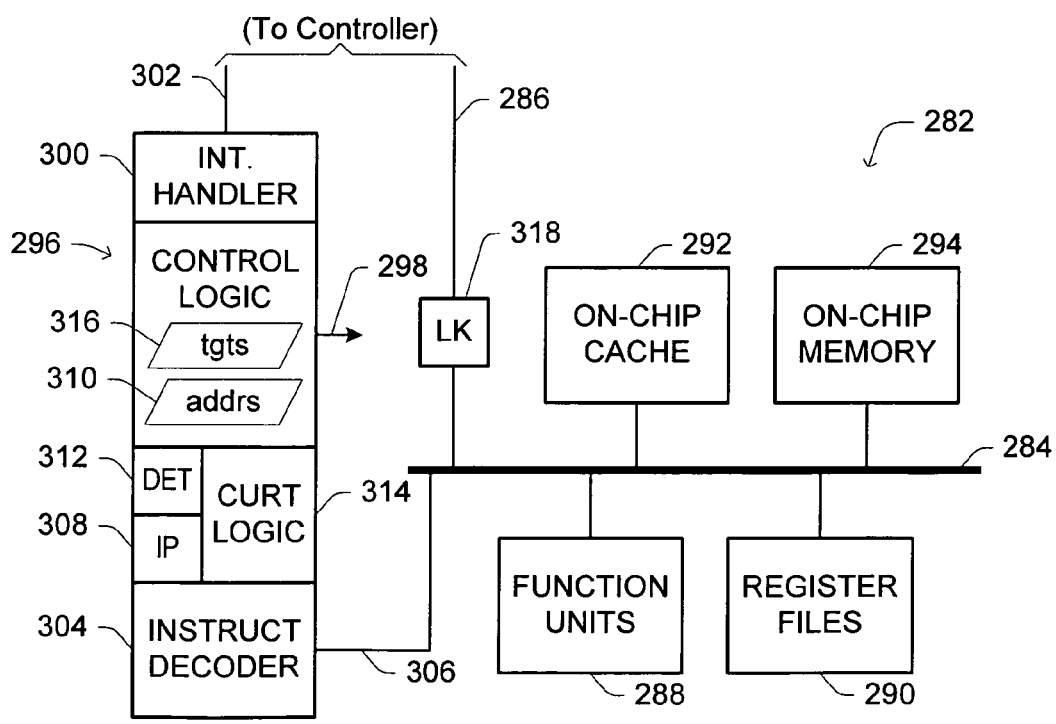
FIG. 8 is a block diagram showing relevant parts of a processor that can be used in an open system computer in accordance with the invention.

FIG. 8 is a block diagram showing relevant parts of a processor 282 that can be used in an open system computer, such as computer 118 of FIG. 2. Internal buses 284 carry data, address, and control signals to the other components of the processor on the integrated-circuit chip or module. Line 286 carries some of these signals to and from a bus controller to communicate with an external bus. Conventional function or execution units 288 perform operations on data from external memory, from register files 290, from cache 292, from internal addressable memory 294, or from any other conventional source. Memory 294, located on the same chip or module as the rest of processor 282, can have a number of technologies or combinations of technologies, such as dynamic read/write, read-only, and nonvolatile such as flash. The internal memory in this implementation partakes of the same address sequence as external system memory, although it can have or be a part of another sequence. The curtained memory rings can be partly or totally contained in addresses located within memory 294.

Control unit 296 carries out a number of operations for sequencing the flow of instructions and data throughout the processor; line 298 symbolizes control signals sent to all of the other components. Interrupt logic 300 receives interrupt requests and sends system responses via lines 302; in some systems, interrupt logic is conceptually and/or physically a part of an external bus controller. A conventional instruction pointer holds the address of the currently executing instruction. Instruction decoder 304 receives the instruction at this address on line 306, and produces a sequence of control signals 298 for executing various phases of the instruction. In modern pipelined and superscalar microprocessors, blocks 308 and 304 become very complex as many instructions are in process at the same time. Their basic functions, however, remain the same for the present purpose.

Control unit 296 further includes a specification or map 310 of one or more address ranges of the memory addresses desired to be curtained. The specification can be in any desired form, such as logic circuitry, a read-only table of addresses or extents, or even a small writable or rewritable storage array. If the addresses are in memories having separate address sequences, additional data specifying the particular memories can be added to the addresses within each sequence. A detector or comparator 312 receives the contents of instruction pointer 308 and the curtained-memory map 310. A curtained memory having multiple rings, subrings, or other levels can have a separate specification for each of the curtained regions. Alternatively, a single specification can explicitly designate the ring or subring that each address range in the specification belongs to.

If the current instruction address from pointer 308 matches any of the addresses in map 310, that instruction is included in a particular curtained code ring or module. Curtain logic 314 then permits the control unit to issue signals 298 for performing certain operations, including reading and writing memory locations in the same ring, or a less privileged ring that might contain secrets. (Additionally, as described below, certain opcodes are restricted to executing only when the CPU is executing curtained code.) For example, if decoder 304 is executing an instruction not located within the range of curtained memory, and if that instruction includes an operand address located within the curtained-memory specification, control unit 296 blocks the signals 298 for reading the data at that address and for writing anything to that address. If a non-privileged access is attempted, the CPU or memory system can flag an error, fail silently, or take other appropriate action. If it is desired to place the curtain logic on a chip other than the processor, a new microprocessor instruction or operating mode can strobe the instruction pointer's contents or other information related to the code executing onto an external bus for comparison with the curtained address ranges.

The execution of trusted code routines is frequently initiated by other programs that are less trusted. Therefore, curtain logic 314 must provide for some form of execution access to the curtained code stored in Rings A and B. However, full call or jump accesses from arbitrary outside code, or into arbitrary locations of the curtained memory regions, might possibly manipulate the secure code, or pieces of it, in a way that would reveal secret data or algorithms in the curtained memory. For this reason, logic 314 restricts execution entry points into curtained memory regions 256 and 258 as well as restricting read/write access to those regions. In one embodiment, the curtained code exposes certain entry points that the code writers have identified as being safe. These often occur along functional lines. For instance, each operation that a piece of curtained code can perform has an accompanying entry point. Calling subroutines at these entry points is permitted, but attempts to jump or call code at other entry points causes an execution fault.

An alternative allows automated checking of entry points and provides additional granularity of rights by permitting entry to curtained memory functions only through a special entry instruction. For example, a new curtained-call instruction, CCALL Ring, Subring, OpIndex, has operands that specify a ring, a subring, and a designation of an operation whose code is located within that ring and subring. This instruction performs conventional subroutine-call operations such as pushing a return address on a stack and saving state information. The stack or the caller's memory can be used to pass any required parameters. A conventional RETURN instruction within the curtained code returns control to the calling routine. Return values can be placed in memory, registers, etc.

When decoder 304 receives a CCALL instruction, curtain entry logic 314 determines whether the calling code has the proper privileges, and whether the instruction's parameters are valid. If both of these conditions are met, then the instruction is executed and the curtained routine is executed from its memory ring. If either condition does not hold, logic 314 fails the operation without executing the called code.

Logic 314 determines whether or not to execute the code by comparing the privilege level of the calling code and the operation-index parameter, with entries in a jump-target table 316 stored in a location accessible to it. The logic to enforce these requirements can be implemented in the memory controller 314, or by code executing in a highly privileged ring such as Ring A. Table I below illustrates one form of jump-target table. The table can be stored in the same curtained memory block as the code itself, or in a memory block that is more privileged; or it can be stored in special-purpose storage internal to the CPU or memory manager.

TABLE I

| Index | Target Address | User | Kernel | Curtain |
|---|---|---|---|---|
| 0 | BAB-PC | FALSE | TRUE | TRUE |
| 1 | REVEAL-PC | TRUE | TRUE | TRUE |
| 2 | LOAD-PC | FALSE | FALSE | TRUE |

An entry for each index, 0–2, gives the (symbolic) target or start address of the code for that operation, and the privileges levels—user, kernel, or curtained—that are permitted to execute the code. "Curtained" level means that only other curtained code can call the routine. Other or finer privilege levels are possible. As an alternative to the above jump table, entry logic 314 could permit only a single entry point into each ring of curtained memory, and employ a passed parameter to specify a particular operation. Or it could, for example, permit calls only to addresses that are predefined as the beginnings of operations. The curtained code itself could verify and call the operation.

Restricting call access to curtained code within processor 282 still leaves open the possibility that outside rogue programs or devices might be able to hijack the code after its execution has begun in order to obtain secrets left in registers, or to otherwise modify machine state to subvert operation. Therefore, control unit 296 ensures atomicity in executing the curtained code: once started, the code performs its entire operation without interruption from any point outside the secure curtained-memory regions. In many cases, it is not necessary to execute an entire function atomically, but only a part. For example, only the code that verifies a bus-master card's identity need be performed atomically, and not its total initialization module. Additionally, the entry code could take steps to prevent subversion. For instance, it could establish new interrupt vectors and memory page tables. In this case, only the entry code must be executed atomically. Once a new interrupt table is established, trusted code can ensure that secrets do not leak in response to an interrupt.

Figure 9:
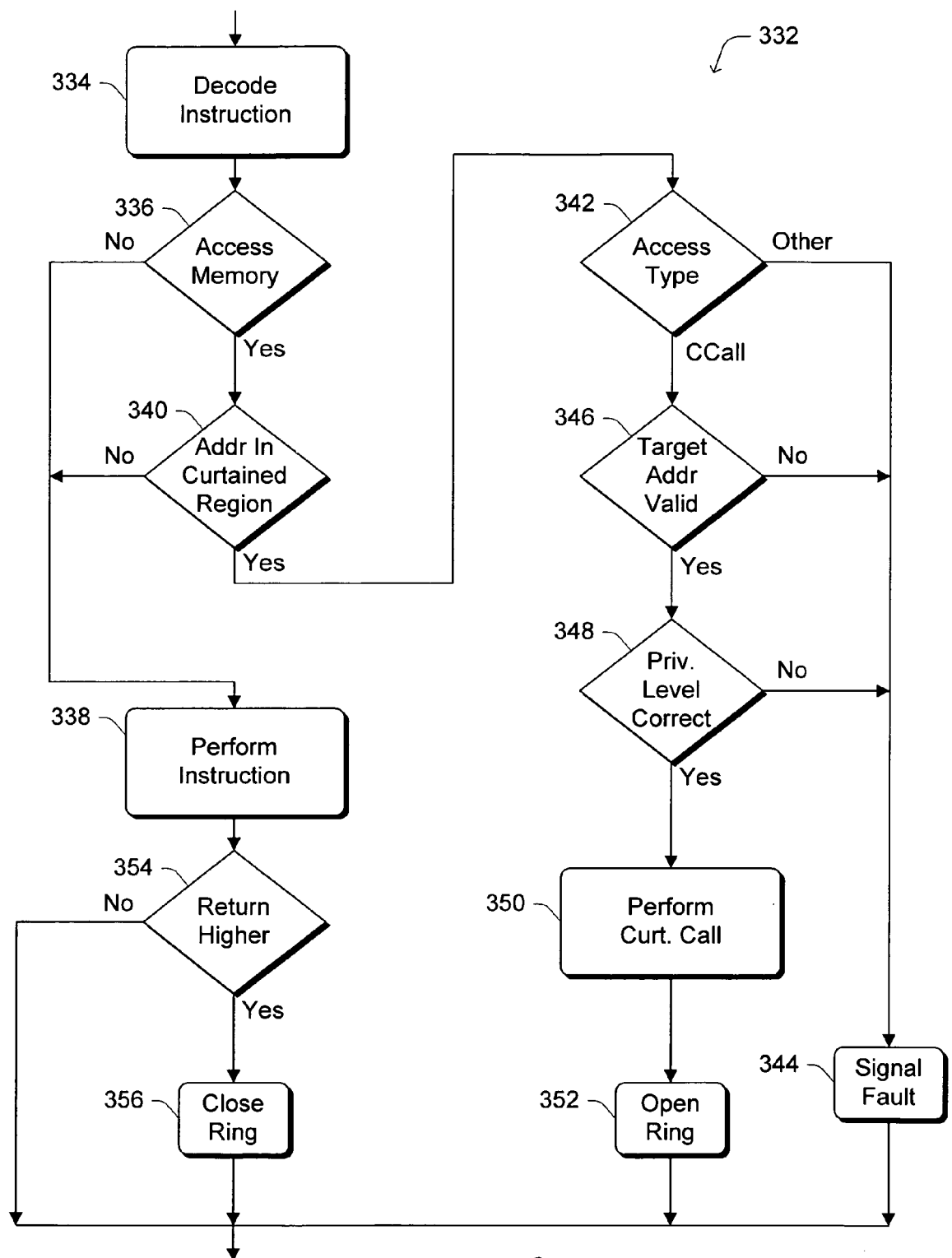
FIG. 9 is a flowchart illustrating an exemplary process of providing curtained execution protection in a processor.

FIG. 9 is a flowchart 332 illustrating an exemplary process for providing curtained execution protection in a processor such as processor 282 of FIG. 8. The process of FIG. 9 is implemented by a processor, such as processor 282. FIG. 9 is described with additional reference to components in FIGS. 7 and 8

For a single-level curtained memory, process 332 refers to the entire curtained region. For a memory organization such as 252 of FIG. 7 having multiple rings or subrings, the term "curtained region" means the levels inside or beside the ring in which the current instruction is located. For example, the curtained region for an instruction whose address is in Ring C in FIG. 7 comprises Ring B (including all its subrings) and Ring A; the curtained region for an instruction in Subring B1 comprises Subrings B2 and B3 (but not the rest of Ring B) and Ring A.

After the current instruction is decoded (step 334), memory addresses associated with the instruction are tested. If the instruction uses virtual addresses, the tests operate upon the physical addresses as translated in step 334. A determination is made whether the instruction accesses any memory location during its execution (step 336). An instruction might read an operand or write data to a memory address, for example. If the instruction does not access any memory, or at least any memory that might contain a curtained region, then the instruction is executed (step 338). If the instruction does involve a memory location, the address is tested to determine whether it is within a region that is curtained off from the current region (step 340). If not, the instruction is executed (step 338). If so, the type of access requested by the instruction is determined (step 342). If the access is anything other than the special curtained-call opcode, then a fault is signaled (step 344), and an appropriate error routine or logic circuit blocks the access. Other accesses include reading data from the location, writing data to it, or executing a normal instruction there.

The only access permitted into a curtained-memory ring is an execution access by a particular kind of instruction, such as the curtained call (CCall) discussed above. If an instruction is detected in step 342 as desiring to initiate execution of code at a location inside a region curtained from the current region, a determination is made as to whether the target entry point is valid (step 346)—that is, whether the requested index is in the jump table. A determination is also made as to whether the current instruction has the privilege level required to invoke the operation at the desired location (step 348). If either test fails (step 346 or 348), a fault is signaled (step 344). If both pass, the curtain-call instruction as described above is executed (step 350).

Steps 352–356 navigate among the rings and subrings of the curtained memory. A CCALL instruction causes the curtained-memory ring containing the target address of the call to be opened (step 352). That is, it makes that ring the current ring for the purposes of process 332. A routine starting at that address thus has read/write and execution access to the memory of the ring, and only rings inside or peer to that ring are now restricted curtained memory. Also in step 352, any extra protection for ensuring atomicity of the routine being executed at the new current level, such as interrupt suspension or bus locking, is engaged. A routine executing in curtained memory can end with a normal Return instruction. If the routine was called from a less secure ring, step 354 causes the current ring to close (step 356) and retreat to the ring from which the call was made, either a less secure ring of curtained memory, or the outer, unsecured memory of Ring C.

Figure 10:
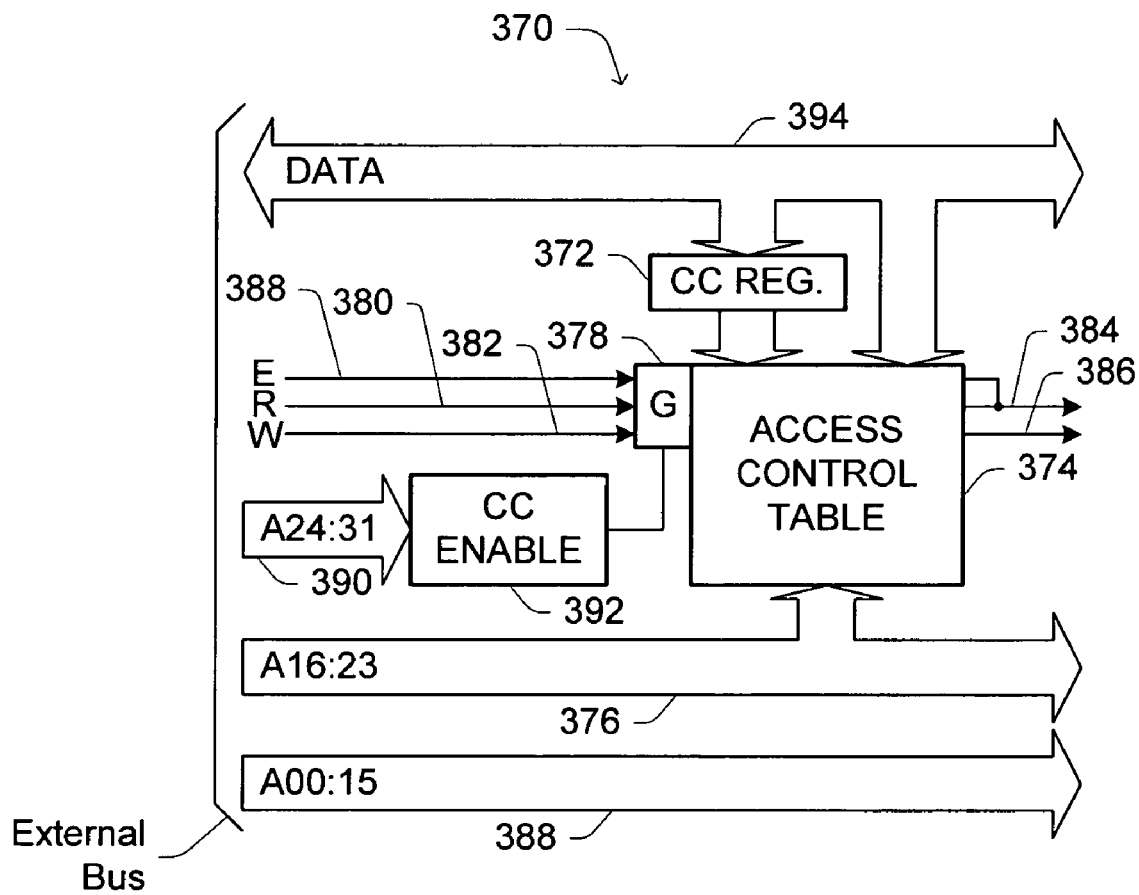
FIG. 10 details an example of hardware added to a computer for defining restricted-access storage as a set of secure memory pages or regions within the same address space as that of system memory.

FIG. 10 details an example of hardware 370, added to computer 118 of FIG. 2, for defining curtained code as a set of secure memory pages or regions within the same address space as that of the system memory. Hardware 370 can be incorporated into a system controller chip of the chipset, or directly into a processor.

An 8-bit curtained-code (CC) register 372 holds a designation of one of a number of security managers running in Ring B, and a designation of one of a number of applications running in Ring B. In general, CCR=n,m signifies application m running in Ring B under the control of security manager n in Ring B. CCR=n,0 means that security manager n itself is executing. CCR=0,0 indicates that a program is running in Ring A, and CCR=FF indicates code running in the unprotected Ring C. The contents of the CCR thus indicate which program is currently running and in what ring or security level. A system having multiple processors has a separate CCR for each one.

Access-control table (ACT) 374 is a fast read/write memory containing 64K entries each associated with a page of memory in system memory 141, specified by bits A16:23 of address bus segment 376, and with a certain combination of Ring-B programs specified by CCR 372. Each ACT entry contains bits that determine the rights for a program combination that accesses that page. Typically, one bit of each entry indicates whether the programs specified by the CCR contents has read privileges for the page specified. Another bit indicates write privileges for the page. A third bit can indicate execution privileges, that is, whether the programs are permitted to jump to or call a program within the page.

The ACT entry contents cause gate 378 to pass or to block processor read and write control lines 380 and 382 to memory read and write lines 384 and 386. In addition, a signal on line 388 indicates that the processor is about to execute program code within the page. (Although most present-day microprocessors do not emit such a signal directly, it can be generated easily.) The third ACT bit controls memory read line 384 to allow or to block reading the addressed byte into the processor for execution. The address layout shown in FIG. 10 envisions a secure memory region having a total of 256 pages addressed by bus segment 376. Each page has 64K bytes, addressed by bits A00:15 of low-order bus segment 388. High-order address bus segment 390 places these pages at a certain point within the overall address space of system memory by enabling block 392 only for a certain combination of address bits A24:31. Block 392 allows gate 378 to pass signals 380 and 382 directly to memory lines 384 and 386 except for addresses within the secure memory region.

Connections from system data bus 394 permit the contents of register 372 and access-control table 374 to be modified in a secure mode when a particular port number is addressed by the processor. Programming these components will be described later.

Computer 118 calls code in a secure page using a special trap facility that can be located in a processor or bus-control chipset, or in memory-manager logic for legacy systems. In this implementation, only a single entry point serves all code executing in any secure page. A calling program identifies the particular routine to be executed as a parameter in a special call instruction.

In addition, a "security porch" enhances execution security for older processors. A memory controller watches instruction fetches after a secure-page routine is called to ensure that the next sixteen or so fetches are executed in ascending order by the initiating processor. If this is the case, then this porch code can be designed so that its keys and self-security instructions are mapped into memory in the region following the porch code for the initiating processor. For example, porch code can set the interrupt vector to a secure handler in secure memory and switch off caching for certain regions, or invalidate the cache. Once this is accomplished, the curtained code can execute without fear of preemption by untrusted code. Enforcing an entry point and protecting the first few dozen instructions allows the curtained memory to be visible to other calls without compromise. An alternative implementation could use a trap into memory protected by a processor system mode, in which the processor is protected against interruption; the system-mode handler can then turn off interrupts and jump into the protected code rather than returning to the interrupting program. However, further protection would still be required against multi-processor or other bus-master attacks.

Figure 11:
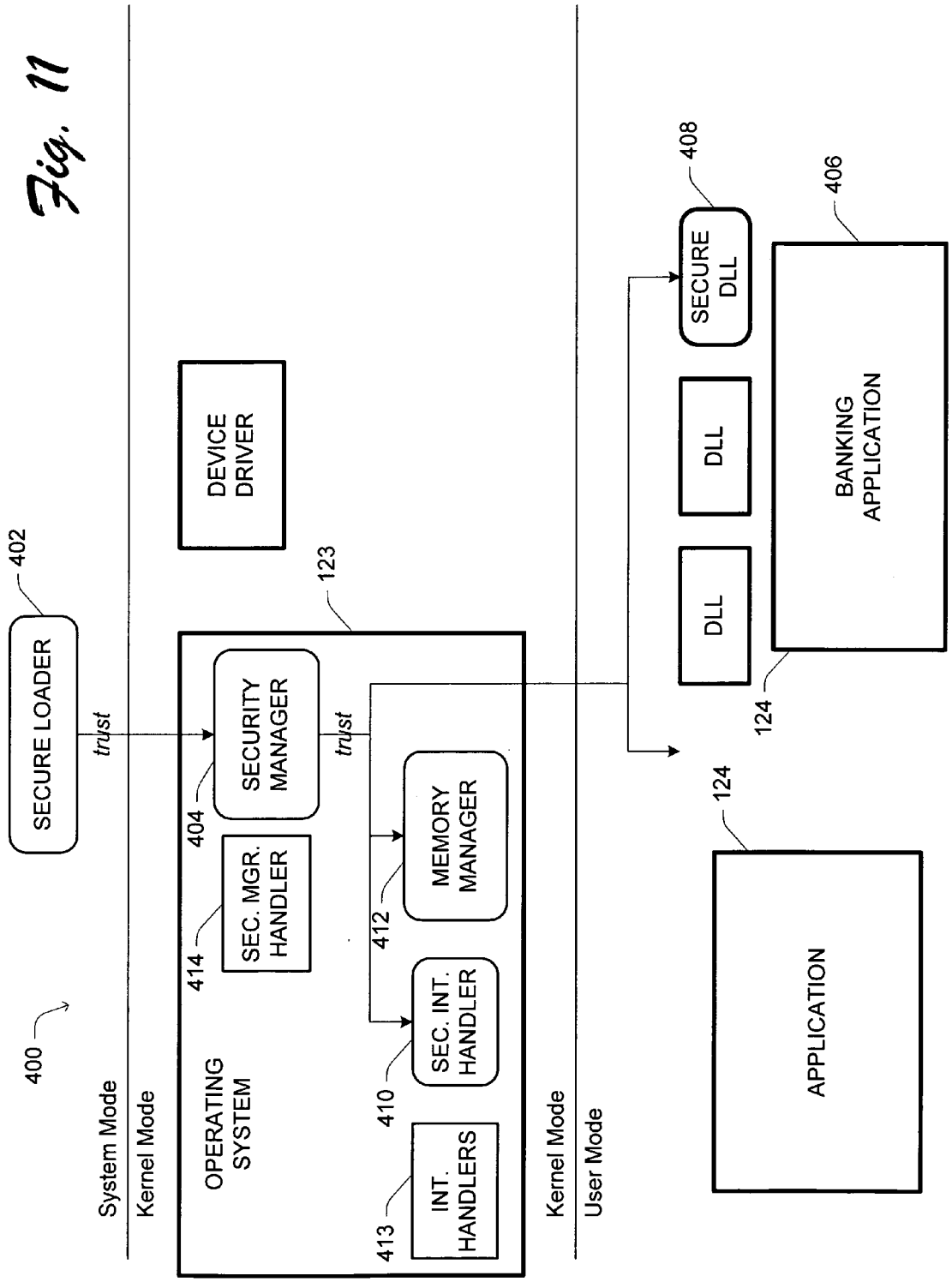
FIG. 11 diagrams components employed in an exemplary open system computer.

FIG. 11 diagrams components 400 employed in the secure pages approach in an illustrative embodiment. Adaptations for other forms of data are within the art. In FIG. 11, software modules running in and storing data in secure memory pages are shown as blocks with rounded corners. Arrows labeled "trust" symbolize the granting of trust from a module to one or more other modules. Dashed horizontal lines indicate processor operating modes.

The root of trust of secure code modules is a secure loader 402, running in Ring A of the secure memory region, under a secure system mode of the processor. Trust descends hierarchically to one or more security managers 404 executing in Ring B, or in one of its subrings, in kernel mode, the same mode as the rest of OS 123. As shown in FIG. 11, most of the remainder of OS 123 need not have any additional protection. Security manager 404 in turn confers trust upon a memory manager responsible for a group of pages of the secure memory; manager 404 also runs in Ring B. Security manager 404 also confers trust at a lower level upon certain designated third parties. A banking institution can provide an application program such as 406 for allowing a user of the computer to access his or her bank account(s) or purchase goods and services. In this example, only one dynamic link library (DLL) 408 used by application 406 requires trust in order to protect the user's private data (e.g., account numbers, balances, transactions, etc.). In fact, because DLLs are frequently shared among multiple programs, it is possible that a single secure DLL can provide protection for other applications as well. Module 408 runs in the processor's user mode, in Ring B of the secure memory. The remaining applications, as well as all other non-secure modules in FIG. 11, run in the outermost memory Ring C. Alternatively, all of the application 406 may require trust and be running in Ring B of the secure memory.

The secure module 408, receiving trust from security manager 404, can in turn entrust a further, lower level of trust in other modules. Each secure module can contain names of one or more other specific modules it is willing to trust, and can confer trust upon them when it receives trust from higher in the tree. Trust can be established declaratively or programmatically, by naming the public key, digest, or other signature of other applications or modules that have access to some or all of their code or data in the secure storage. Security manager 404, via its privileged interaction with memory manager 412, interprets and establishes these hierarchical trust relationships.

Security manager 404 also provides a way for the system to vouch cryptographically for the digest or signature of code running in a secure page. When computer 118 is communicating with a portable IC device, such as portable IC device 116 of FIG. 1, SM 404 signs a certificate that a particular application component (such as DLL 408 or application 406) is running in a secure page. The portable IC device thus knows whether the application or module that will handle the sensitive data is operating in a secure manner. As long as neither the SM 404 nor the hardware security has been compromised, the portable IC device knows all the information necessary to establish trust, namely, that other components in the operating system cannot access the private data. The portable IC device may also name other components that it trusts to work cooperatively on the private data. The portable IC device therefore need only trust certain applications to receive the private data, and the SM 404 and security hardware will ensure that the application is not subverted and that its secrets are not read or changed by untrusted code.

Code running in the secure memory pages cooperates with the code in other, untrusted modules of the main operating system 123. As described above, any module can call into a secure page using the special trap facility. The secure-page code can exit normally back to an untrusted module, relinquishing its protected status as it does so; or, a timer event or other interrupt can occur upon exit. In order to reduce changes to the remainder of the OS, its normal interrupt handler 401 is permitted to field interrupts, even though it is not trusted. Therefore, security manager 404 sets up a new trusted interrupt handler 410. This handler saves the system state in a secure page, so that no other code can access it or any secrets it might contain. Handler 410 can then initiate a software interrupt that the untrusted part of the OS is allowed to process. Normal OS mechanisms reschedule security manager 404, which in turn reschedules the secure module.

The security manager 404 is responsible for setting up an address space in protected memory appropriate for a secure application or module that is about to run. For instance, when the OS context switches into a trusted kernel component, a banking application's own secure pages, all the rest of kernel memory, and any other modules that have explicitly granted trust on this OS module will be mapped into active memory. It should be noted here that the mode of the processor is tied directly to the code that is executing. For instance, there is no 'enter user mode' instruction; the processor merely traps to the code entry points in a secure page. During this transition, the mode changes automatically. This allows placing secret keys and code in a module from which only the trusted code can ever access the secret keys, providing a broad general-purpose model of platform security.

Security manager 404 is the only piece of code that is allowed to set or change page permissions in secure memory. The SM 404 establishes a memory map by telling the programmable memory manager to map or hide various pages in the system-memory address space by writing to a port or a memory address that programs memory manager 412.

When an OS module calls the SM 404 indicating an application 406 that should execute, the SM 404 maps the application's pages, along with any other secure pages that the application has access to, into the processor's address space, then starts executing the application. Should an interrupt occur, the trusted code saves the current machine state in a safe place. The security manager allows OS 111 to handle the interrupt. The normal interrupt handler 413 reschedules the SM 404, which later restarts the interrupted application with the safely saved state. Additionally, code in a secure page might have to call functions provided by an untrusted module of the operating system. It can manage this by requesting security manager 404 to save its state in a safe location before calling the normal OS module, then restoring the state and marshalling parameters back into the secure page when the OS module returns. Code in a secure page has access to all other virtual memory. For instance, a kernel secure-page component will have access to all of kernel memory in addition to its own memory and some other selected secure pages. Further, a user-mode secure-page component has the application's memory mapped into its virtual memory, and runs in user mode.

Security-manager handler 414 runs as a normal OS module with kernel privileges but no special security or trust. It has two broad sets of functions. The first is to provide an interface to the OS for loading and unloading curtained code for secure modules. The second is to provide the normal-code entry point to SM functions. It is called on an OS thread and handles the context switch into the secure code comprising the SM. Should the SM be preempted, the SM-Handler will trampoline the interrupt to the OS interrupt handler 401, and will in turn be re-scheduled by the OS after the interrupt has been handled.

Another function of security manager 404 is to offer several types of cryptographic services to the application modules. First, as mentioned, it offers a way for an application to name other applications that it trusts to access its data. As a practical matter, this can be accomplished by placing binary resources in an application-level secure DLL such as 408 that name the digest or public key of other trusted modules. Upon initial load—or later—the SM 404 identifies the trusted modules, so that a call to them maps their pages. The second facility allows a user to establish cryptographically which application he is communicating with. There are several ways of doing this. A convenient way is to allow the user's portable IC device to encrypt a data block that contains its keys or other secret data, and that names the digest of the target secure application. The application alone is able to decrypt the secrets, and only gives the secrets to the named application. The third facility is a local facility in computer 118 for storing secret data such that only it or another trusted component can access them. A convenient way of doing this is to allow the application to store a secret of a target application encrypted with a key provided by SM 404. The SM 404 then ensures that only the named application ever gets to access the secret.

Because a security manager is relatively complex and is specific to a particular operating system, it is typically ill suited to being hard-coded in the processor or motherboard of a system by the manufacturer. On the other hand, providing sufficient security usually requires some form of protection at a system level. This embodiment employs a small, generic code module fixed in ROM at the manufacturer level to provide a small number of generic functions adaptable for use with many different security managers. Secure loader 402 loads an OS-specific security manager 404 into a secure page and vouches for it cryptographically, using the loader's own keys or secrets in a secure online session. Initially, the Secure Loader might even receive some code and secrets online from a system manufacturer, OS vendor, or internet service vendor. After this one online interaction, the security manager can be stored in encrypted form on disk, and its decryption and verification managed by the secure loader when the system is booted. If the Security Manager does not contain secrets—e.g., if it relies upon certificates minted by the secure loader—it could even be shipped in cleartext on a CD-ROM.

Secure loader 402 typically conducts an authenticated encrypted online session with an OS vendor to establish that the vendor can ensure that the code and keys are being issued to a trusted module. Encryption is needed to ensure that untrusted parties, including the owners and legitimate users of the system, cannot modify the code or steal embedded secrets. The OS vendor transmits appropriate SM code and unique keys and a certificate that can be used in subsequent boots. The security loader stores the SM to designated secure pages, and also stores it to disk or other permanent storage in encrypted form so that it can be used subsequently without an online step.

When security manager 404 receives a request to execute a particular application such as 406, it restricts the pages of secure memory that can be mapped. In this implementation, security manager 404 informs memory manager 412 which mode it is about to enter. The memory manger then adjusts access-control table 374 of FIG. 10 to contain the proper per-page access permissions, i.e., the values of the read, write, and execute bits for each page of secure memory. Again, the memory manager can only restrict the permissions initially programmed into the table 374 by security manager 404, and cannot expand them. When an application module completes execution, it maps its pages out of memory, or requests the security manager to do so. It then relinquishes control.

As mentioned earlier, memory manager 412 must be programmed with the various privileges for each page of secure memory at the different levels specified by different possible contents of register 372 of FIG. 10. It is convenient here to make programming the access-control table possible only when secure loader 402 is executing, that is, when CCR=0,0 indicates that execution is taking place in Ring A. Programming can be accomplished by writing to a dedicated port or mapping it into memory and issuing ordinary reads and writes. The secure loader has its own rudimentary software memory manager that allocates unused pages to the Ring B security managers 404 on demand. These specify the protections to be applied to the pages they own, and the Ring A code programs the hardware table 374 accordingly. Of course, loader 402 must not be subject to spoofing attacks; therefore, the security managers 404 pass parameters in their own secure memory, so that another attacking SM, or the OS, cannot change the request.

Figure 12:
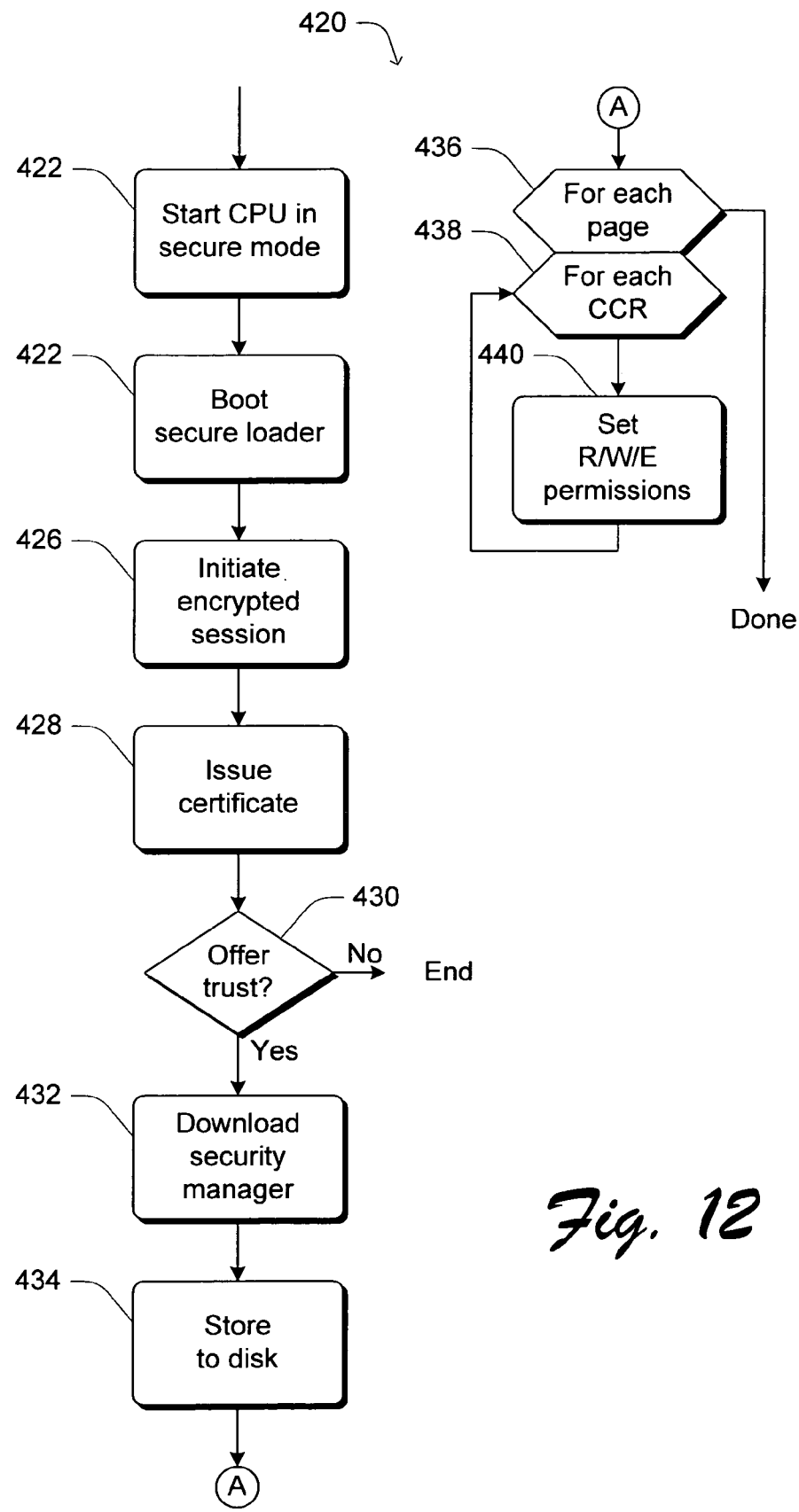
FIG. 12 is a flowchart illustrating an exemplary process for activating a secure loader in accordance with the invention.

FIG. 12 is a flowchart illustrating an exemplary process for activating the secure loader. Description of the steps of method 420 in a particular order does not necessarily imply any specific temporal sequence. The process of FIG. 12 is implemented by a computer (e.g., computer 118 of FIG. 2), and may be performed partially or wholly in software. FIG. 12 is described with additional reference to components in FIGS. 10 and 11.

When the computer starts, secure loader 402 of FIG. 11 is activated (steps 422–434). The processor is reset in a high-security system mode (step 422), and the loader is booted into Ring A of secure memory in this mode (step 424). An encrypted connection to the OS vendor is initiated (step 426), and an authentication (such as a signed certificate) is minted and issued to the vendor (step 428). If the vendor decides not to trust the system, then the security manager module is not loaded and the process ends. However, if the vendor decides to trust the system (step 430), it downloads an encrypted security manager module 404 and keys (step 432), and stores it to disk (step 434). (The vendor or others can download other code as well, if desired.) Encryption assures that untrusted persons, including the owner of computer 118, cannot modify the code or steal secret keys or other downloaded data. If it does not itself contain any secret data, and relies on verifications supplied by loader 402, then manager 404 can be stored in a non-encrypted cleartext form. Storing the code and data in a nonvolatile storage obviates the need for downloading the same code and keys again when system 118 is rebooted. Alternatively, the security manager can be supplied with the OS on a CD-ROM or other medium so that it does not need to be downloaded. FIG. 12 shows only a single security manager. Different OSs, or even the same OS, can have multiple security managers.

In 436–440, secure loader 402 programs memory manager 412. Each page of memory (step 436) has a set of permissions for different CC-register contents (step 438). Again, CC register 372 defines which secure-memory ring and subring is active. The read, write, and execute permissions for each entry of access-control table 374 are defined (step 440). Modules farther down in the trust hierarchy can restrict these privileges, but cannot expand them.

Operation

Figure 13:
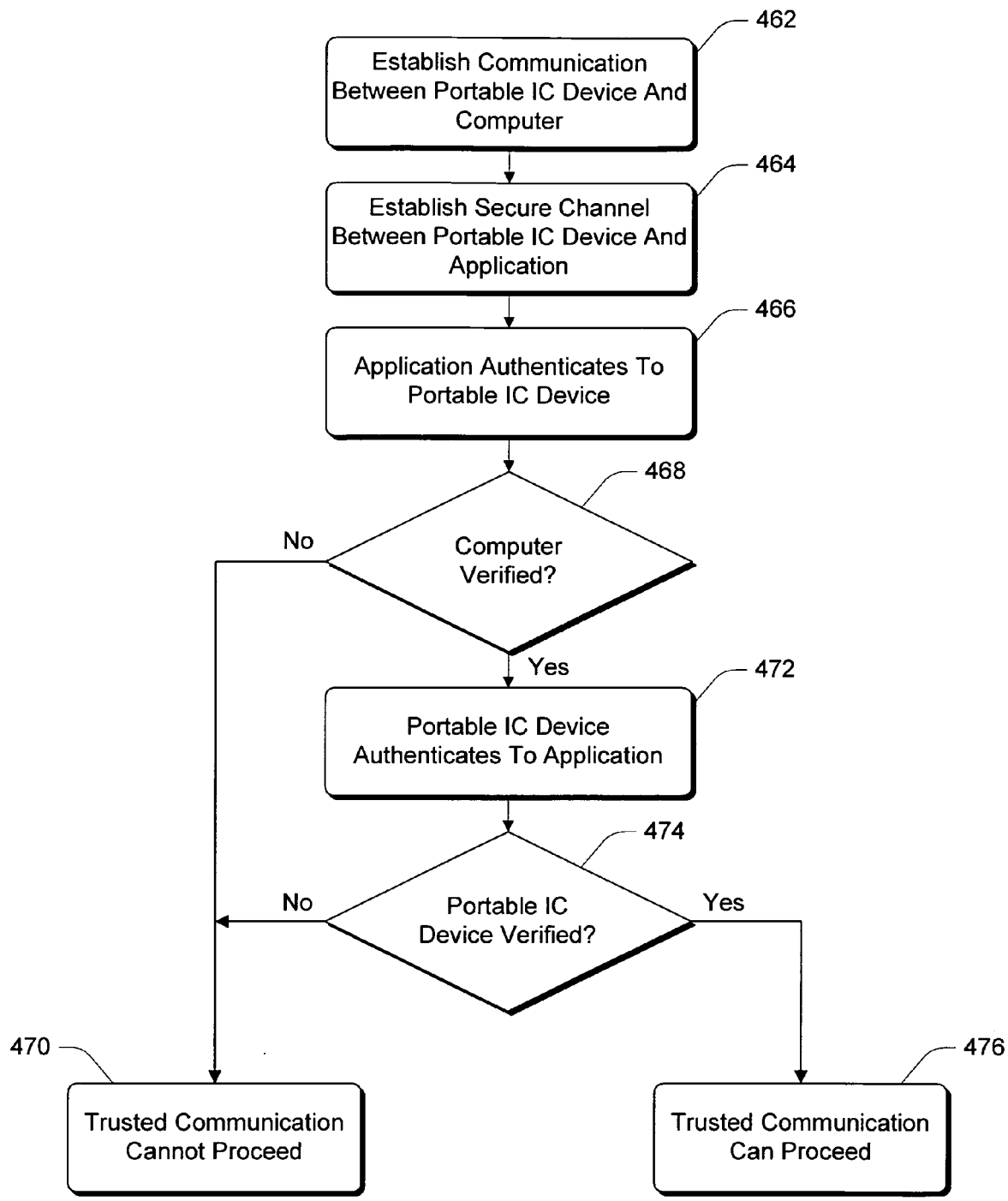
FIG. 13 is a flowchart illustrating an exemplary process for two-way authentication in accordance with the invention.

FIG. 13 is a flowchart illustrating an exemplary process for two-way authentication in accordance with the invention. The process of FIG. 13 is implemented by a combination of a portable IC device (e.g., device 116 of FIG. 2) and a computer (e.g., computer 118 of FIG. 2), and may be performed partially or wholly in software. FIG. 13 is described with additional reference to components in FIG. 2.

Communication between the portable IC device 116 and the computer 118 is initially established (step 462). Applications executing on the computer can be authenticated, such as via the authenticated boot or curtaining methodologies discussed above. The communication can be established by communicatively coupling the portable IC device to the computer using any of a variety of conventional coupling technologies.

Once such communication is established, a secure channel between the portable IC device and the application is established (step 464). The secure channel provides an assurance that others cannot intercept, modify, replay, or decipher messages being exchanged between the IC device and the application via the channel. A key-exchange protocol such as the well-known Diffie-Hellman key-agreement protocol is used to establish the secure channel in step 464. Alternatively, other conventional cryptographic techniques can be used to establish the secure channel between the portable IC device and the computer.

Once a secure channel between the portable IC device and the application is established, the application and optionally the OS executing on the computer authenticate themselves to the portable IC device (step 466). This application is the application that will be accessing information on the portable IC device. For example, the application may be a banking application that will be ordering products or services as requested by the user and using a signature provided by the portable IC device.

Whether trusted communication between the portable IC device and the desired application and OS can proceed is dependent, in part, on whether the portable IC device can verify the authenticity of the application (step 468). If the portable IC device cannot verify the authenticity of the application, OS, and hardware, then trusted communication cannot proceed (step 470). It should be noted that if the portable IC device cannot verify the authenticity of the application, etc., trusted communication cannot proceed regardless of whether the portable IC device is authenticated to the application. If the desired application and OS can indeed authenticate themselves to the portable IC device, the portable IC device indicates this fact to the user via the optional indicator light 132 or similar mechanism. The user then knows that it is safe to trust the computer.

If the portable IC device can verify the authenticity of the application, then the portable IC device authenticates itself to the application (step 472). The user can use the facilities of the computer to do so, such as the keyboard and display, since they are under the control of a trusted application and OS. Whether trusted communication between the portable IC device and the application can proceed is also dependent on whether the application can verify the authenticity of the portable IC device (step 474). If the application cannot verify the authenticity of the portable IC device, then trusted communication cannot proceed (step 470). However, if the application can verify the authenticity of the portable IC device, then trusted communication can proceed (step 476), with both the portable IC device and the computer knowing that the other is trustworthy. An application that is deemed trustworthy provides an assurance to the user that the application will not perform unauthorized actions on behalf of the user (e.g., order products using the user's signature). The portable IC device can thus unlock itself and make the private information stored thereon accessible to the application.

In the illustrated example, the computer authenticates itself to the portable IC device (step 466) before the portable IC device authenticates itself to the computer (step 472). By having the computer authenticate itself first, the user can trust the computer to accept a personal identification number (PIN) or other confidential information used by the portable IC device to authenticate itself to the computer. Alternatively, these authentication steps 466 and 472 could occur in reversed order (with the portable IC device authenticating itself to the computer first) or substantially concurrently.

Figure 14:
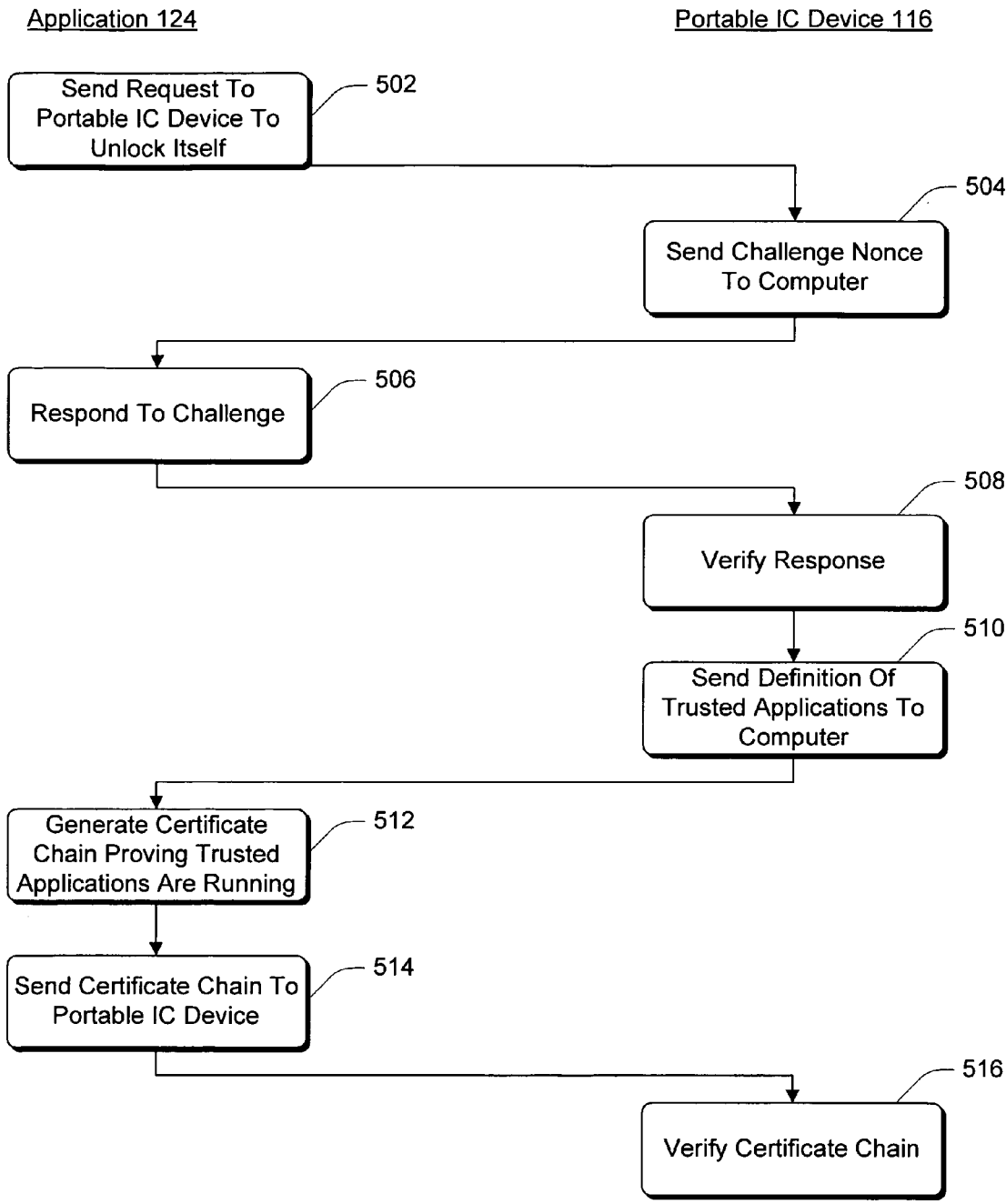
FIG. 14 is a flowchart illustrating an exemplary process for a computer application to authenticate itself to a portable IC device in accordance with the invention.

FIG. 14 is a flowchart illustrating an exemplary process for a computer application to authenticate itself to a portable IC device in accordance with the invention. The process of FIG. 14 is implemented by a combination of a portable IC device (e.g., device 116 of FIG. 1) and a public computer (e.g., computer 102 or 104 of FIG. 1), and may be performed partially or wholly in software. FIG. 14 is described with additional reference to components in FIGS. 2, 3, and 11, and describes step 466 of FIG. 13 in more detail.

The application that will be accessing information on the portable IC device initially sends a request to the portable IC device to unlock itself (step 502). The portable IC device responds to the request by sending a challenge nonce to the application (step 504). In the illustrated example, the challenge nonce comprises a random number generated by the portable IC device. Upon receiving the challenge nonce, the application responds to the portable IC device (step 506). In the illustrated example, the response is generated by signing the received random number using a private key for the application.

The portable IC device then verifies the response (step 508). The response is verified using the public key for the application. If the response cannot be verified, then the application is not verified and trusted communication between the portable IC device and the application cannot occur. However, if the response can be verified, then the portable IC device sends a definition of a set of trusted applications to the application (step 510). This definition of a set of trusted applications can be an explicit, pre-determined list that is maintained on the portable IC device, or it can be a list of rules maintained on the portable IC device that implicitly define such a list of trusted applications. This list can be provided by the manufacturer of device 116, or alternatively can be generated (or modified) by an administrator, the distributor of the device 116, or the user. Examples of such applications include banking applications, applications controlling purchasing for retailers, etc. Alternatively, the list may only identify trustworthy processor(s) and operating system(s) with the individual applications relying on the operating system to vouch for their trustworthiness.

Upon receiving the definition of the set of trusted applications, the application has a certificate chain generated indicating that it is one of the trusted applications and is currently executing on the computer (step 512). The certificate chain authenticates the application—proving that the trusted application was running on the computer when the challenge was received. This certificate chain is then sent to the portable IC device (step 514). The portable IC device then verifies the certificate chain received from the application (step 516). Trusted communication between the application and the portable IC device can only proceed if the certificate chain can be verified.

The manner in which the certificate chain is generated can vary, depending on the authentication methodology being used. To generate the certificate chain using the authenticated boot methodology, CPU 134 of FIG. 3 mints an OS certificate that contains data from the portable IC device 116 and an identity of the OS. The OS certificate takes the following form:

OS Certificate=(SIR, Reply, Data, $K^{CPU}$) signed by $K^{CPU-1}$

The "data" can be the challenge nonce from step 504. In addition to the data, the OS certificate contains the SIR value, a reply, and the CPU's public key $K_{CPU}$. The "reply" can optionally contain all of the data written to the boot log 70 so that the portable IC device can evaluate what software components are currently loaded and executing. In other cases, the portable IC device could just trust the OS publisher (and hence simply the value of the SIR). The OS certificate is signed using the CPU's private key $K_{CPU}^{-1}$. Effectively, the OS certificate says "The processor named $K_{CPU}$ was running the Operating System SIR with the specified boot log when it received the challenge". (In the case where the boot log is included, the CPU is including more information, effectively saying "Further, it was running this OS revision, with these version components, and these device drivers and applications.")

The newly-minted OS certificate and the CPU manufacturer's certificate 152 and OEM certificate 141 are returned to the portable IC device as the certificate chain. The OS certificate and manufacturers' certificates are validated using a series of tests. Failure of any one of the tests results in failure of the verification step 516. However, passing all tests authenticates the application to the portable IC device, proving that the trusted application is running on the computer 118.

The first test is whether the portable IC device recognizes the SIR value contained in the OS certificate and trusts the associated operating system.

Assuming the OS is trusted, the portable IC device next determines whether the data is the same challenge nonce that it generated and supplied to the application. If the data returned in the reply fails to match the challenge provided by the portable IC device, the verification fails. However, if the two match, the portable IC device evaluates whether the OS certificate is properly signed with the CPU's private key $K_{CPU}^{-1}$. The portable IC device makes this evaluation using the enclosed public key $K_{CPU}$.

With respect to the CPU manufacturer's certificate, the portable IC device determines whether the certificate names the same public key $K_{CPU}$ used in the OS certificate. If so, the portable IC device continues to the next test; otherwise, the verification fails.

The portable IC device next examines whether the manufacturer certificate is signed by the manufacturer's private key $K_{MFR}^{-1}$ by using the manufacturer's public key $K_{MFR}$ and whether the OEM certificate is signed by the OEM's private key $K_{OEM}^{-1}$ by using the OEM's public key $K_{OEM}$. If the signatures are not proper, the verification fails.

If the signatures are proper, the portable IC device verifies that the application it is communicating with is indeed a trusted application. If the application is not on the list of trusted applications, then the verification fails.

Alternatively, rather than having the portable IC device evaluate whether a trusted application is connected, the evaluation could be performed by the trusted operating system. The portable IC device would provide the definition of the list of trusted applications to the application, which would make the definition available to the operating system. The operating system certificate and the processor and OEM certificates would be provided analogous to the above discussion, however, the "reply" could include an indication of the application that is connected to the portable IC device (the same application that requested the portable IC device to unlock itself). Additionally, the portable IC device can use the boot log to determine whether any untrusted OS components have been loaded.

In order to generate the certificate chain using the curtaining methodology, the process is similar to that of the authenticated boot methodology, however a certificate from the operating system is not necessary. Rather, the security manager 404 of FIG. 11 would mint a new certificate taking the following form:

Certificate=(Data, $K_{manager}$) signed by $K_{manager}^{-1}$

The "data" includes the challenge nonce from step 504.

(In this formulation, the security manager holds $K_{manager}^{man-1}$ in sealed storage. This approach eliminates the need for transmitting the processor certificate and OEM certificate, since they must already have been used to remove $K_{manager}^{man-1}$ from sealed storage.)

The newly minted loader certificate is returned to the portable IC device as the certificate chain. The certificates are validated by the portable IC device using a series of tests, failure of any one of which results in failure of the verification step 516. The first test is whether the data identifies a trusted application as being connected to the portable IC device. The second test is whether the certificate is properly signed with the security manager's private key $K_{manager}^{-1}$. The portable IC device makes this evaluation using the known public key $K_{manager}$.

Figure 15:
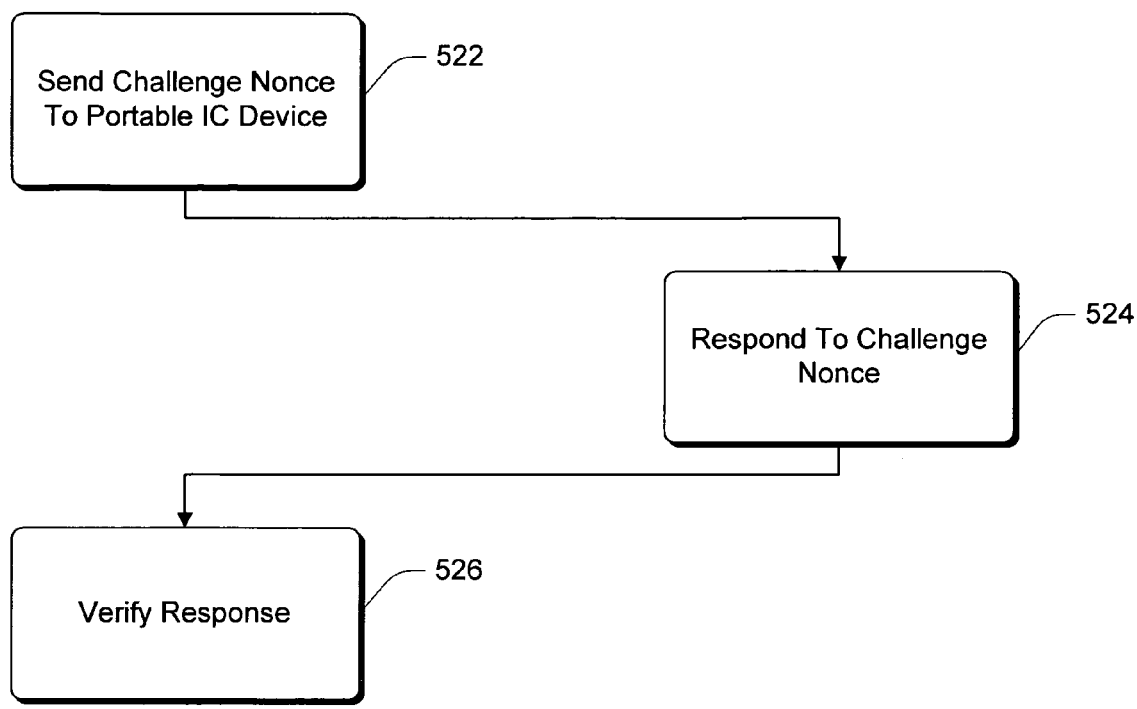
FIG. 15 is a flowchart illustrating an exemplary process for a portable IC device to authenticate itself to a computer system in accordance with the invention.

FIG. 15 is a flowchart illustrating an exemplary process for a portable IC device to authenticate itself to a computer system in accordance with the invention. The process of FIG. 15 is implemented by a combination of a portable IC device (e.g., device 116 of FIG. 1) and a public computer (e.g., computer 102 or 104 of FIG. 1), and may be performed partially or wholly in software. FIG. 15 is described with additional reference to components in FIG. 2, and describes step 472 of FIG. 13 in more detail.

The application that will be accessing information on the portable IC device initially sends a challenge, also referred to as a "challenge nonce", to the portable IC device (step 522). In the illustrated example, the challenge nonce comprises a random number generated by the application. Upon receiving the challenge nonce, the portable IC device responds to the challenge (step 524). In the illustrated example, the response is generated by signing the received random number using the portable IC device's private key. This signed number is then returned to the application as the response.

Upon receiving the response, the application verifies the response (step 526). In the illustrated example, the response is verified using the portable IC device's public key, which is known to the application. The public key can be made known to the application in any of a variety of conventional manners, such as transmitting the public key to the application when communication between the application and the portable IC device is initially established (step 462 of FIG. 13). As only the portable IC device knows the portable IC device's private key, the application can verify the authenticity of the portable IC device by evaluating, using the portable IC device's public key, whether the random number was properly signed with the portable IC device's private key.

Additional user-verification may also be required, such as requiring the user to enter a valid PIN. This user-verification may be implemented as part of the response and verification steps 524 and 526, or alternatively may be an additional set of steps after the response is verified in step 526.

CONCLUSION

Thus, the invention provides for authenticating an open system application to a portable IC device. This authentication allows the authenticity of an application(s) on the open system to be proven to the portable IC device. The authentication advantageously allows the application(s) on the open system to be trusted by the portable IC device, providing an assurance that the private nature of information on the portable IC device made available to the application(s) will be maintained and that such information will not be misused.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An apparatus comprising:
   a processor; and
   a nonvolatile memory, coupled to the processor, that stores both data and a program that, when a request to access the data is received from a requesting application executing on a computer coupled to the apparatus, causes the processor to allow access to the data only if the requesting application can prove that the requesting application is an application on a list of trusted applications maintained by the apparatus.

2. An apparatus as recited in claim 1, wherein the apparatus comprises a smart card.

3. An apparatus as recited in claim 1, wherein the program further causes the processor to:
   send, to the requesting application, a challenge;
   receive a response to the challenge from the requesting application;
   verify the response; and
   determine whether the requesting application is an application on the list of trusted applications only after the response is verified.

4. An apparatus as recited in claim 1, wherein the program further causes the processor to allow the requesting application to prove that the requesting application is an application on the list of trusted applications by:
   sending a definition of a set of trusted applications to the requesting application; and receiving an indication from the requesting application that the requesting application is an application on the list of trusted applications.

5. An apparatus as recited in claim 4, wherein the definition of the set of trusted applications is a list of rules that implicitly define the list of trusted applications.

6. A method implemented in a device, the method comprising:
   receiving, from a requesting application executing on a computer coupled to the device, a request;
   allowing the requesting application to access data stored on the device only if the requesting application can prove that the requesting application is an application on a list of trusted applications maintained on the device.

7. A method as recited in claim 6, wherein the device comprises a smart card.

8. A method as recited in claim 6, further comprising:
   sending, to the requesting application, a challenge;
   receiving a response to the challenge from the requesting application;
   verifying the response; and
   determining whether the requesting application is an application on the list of trusted applications only after the response is verified.

9. A method as recited in claim 6, further comprising allowing the requesting application to prove that the requesting application is an application on the list of trusted applications by:
   sending a definition of a set of trusted applications to the requesting application; and
   receiving an indication from the requesting application that the requesting application is an application on the list of trusted applications.

10. A method as recited in claim 9, wherein the definition of the set of trusted applications is a list of rules that implicitly define the list of trusted applications.

11. One or more computer readable media having stored thereon instructions that, when executed by one or more processors of a device, cause the device to:
   receive, from a requesting application executing on a computer coupled to the device, a request;
   allow the requesting application to access data stored on the device only if the requesting application can prove that the requesting application is an application on a list of trusted applications maintained on the device.

12. One or more computer readable media as recited in claim 11, wherein the device comprises a smart card.

13. One or more computer readable media as recited in claim 11, wherein the instructions further cause the one or more processors to:
   send, to the requesting application, a challenge;
   receive a response to the challenge from the requesting application;
   verify the response; and
   determine whether the requesting application is an application on the list of trusted applications only after the response is verified.

14. One or more computer readable media as recited in claim 11, wherein the instructions further cause the one or more processors to allow the requesting application to prove that the requesting application is an application on the list of trusted applications by:
   sending a definition of a set of trusted applications to the requesting application; and
   receiving an indication from the requesting application that the requesting application is an application on the list of trusted applications.

15. One or more computer readable media as recited in claim 14, wherein the definition of the set of trusted applications is a list of rules that implicitly define the list of trusted applications.

* * * * *